US012764580B2

(12) United States Patent
Rune et al.

(10) Patent No.: US 12,764,580 B2
(45) Date of Patent: Oct. 13, 2026

(54) PRECONFIGURED SMTC AND MEASUREMENT GAPS IN NTN

(71) Applicant: Telefonaktiebolaget LM Ericsson (PUBL), Stockholm (SE)

(72) Inventors: Johan Rune, Lidingö (SE); Helka-Liina Määttänen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 353 days.

(21) Appl. No.: 18/554,238

(22) PCT Filed: Apr. 14, 2022

(86) PCT No.: PCT/IB2022/053545
§ 371 (c)(1),
(2) Date: Oct. 6, 2023

(87) PCT Pub. No.: WO2022/219589
PCT Pub. Date: Oct. 20, 2022

(65) Prior Publication Data

US 2025/0016592 A1 Jan. 9, 2025

Related U.S. Application Data

(60) Provisional application No. 63/174,630, filed on Apr. 14, 2021.

(51) Int. Cl.
*H04W 24/10* (2009.01)

(52) U.S. Cl.
CPC .................................. *H04W 24/10* (2013.01)

(58) Field of Classification Search
None
See application file for complete search history.

(56) References Cited

U.S. PATENT DOCUMENTS

2022/0030532 A1* 1/2022 Hajir .................. H04B 7/18513
2022/0248282 A1* 8/2022 Fu ....................... H04L 27/2657

FOREIGN PATENT DOCUMENTS

WO WO2020083121 A1 4/2020
WO WO2021017690 A1 2/2021
(Continued)

OTHER PUBLICATIONS

ETSI TS 138 331 V16.3.1 (Jan. 2021); 5G; NR; Radio Resource Control (RRC); Protocol specification (3GPP TS 38.331 version 16.3.1 Release 16).

(Continued)

*Primary Examiner* — Chirag G Shah
(74) *Attorney, Agent, or Firm* — Ericsson Inc.

(57) ABSTRACT

According to some embodiments, a method performed by a wireless device comprises receiving a measurement configuration to measure reference signals from one or more satellite cells of a plurality of satellite cells. The measurement configuration includes one or more parameters that indicate how the measurement configuration is to be updated over time. The method further comprises: measuring a reference signal on one or more selected satellite cells using a first measurement configuration based on the received measurement configuration; dynamically adapting the measurement configuration based on the received parameters that indicate how measurement configuration is to be updated resulting in a second measurement configuration; and measuring a reference signal on one or more selected satellite cells using the second measurement configuration.

13 Claims, 15 Drawing Sheets

(56) References Cited

FOREIGN PATENT DOCUMENTS

| | | | |
|---|---|---|---|
| WO | WO2021088043 | A1 | 5/2021 |
| WO | WO2022029720 | A1 | 2/2022 |

OTHER PUBLICATIONS

3GPP TR 38.821 V16.0.0 (Dec. 2019); 3rd Generation Partnership Project; Technical Specification Group Radio Access Network; Solutions for NR to support non-terrestrial networks (NTN) (Release 16) [due to size, this reference has been split into four parts].

3GPP TR 38.811 V15.4.0 (Sep. 2020); 3rd Generation Partnership Project; Technical Specification Group Radio Access Network; Study on New Radio (NR) to support non-terrestrial networks (Release 15).

3GPP TSG-RAN2 Meeting #108; Reno, USA, Nov. 18-22, 2019; Agenda Item: 6.6.4.3; Source: Huawei, HiSilicon; Title: Discussion on SSB measurement in NTN (R2-1915189).

3GPP TSG RAN meeting #86; Sitges, Spain, Dec. 9-13, 2019; Source: Thales; Title: Solutions for NR to support non-terrestrial networks (NTN); Agenda Item: 9.1.2—Proposals led by RAN2; Release: Rel-17 (RP-193234 (revision from RP-192502, 3144)).

3GPP TSG RAN Meeting #86; Sitges, Spain, Dec. 9-31, 2019; Source: MediaTek Inc.; Title: New Study WID on NB-IoT/eTMC support for NTN (RP-193235).

PCT International Search Report issued for International application No. PCT/IB2022/053545—Jul. 11, 2022.

PCT Written Opinion of the International Searching Authority issued for International application No. PCT/IB2022/053545—Jul. 11, 2022.

* cited by examiner

PRECONFIGURED SMTC AND MEASUREMENT GAPS IN NTN

PRIORITY

This nonprovisional application is a U.S. National Stage Filing under 35 U.S.C. § 371 of International Patent Application Serial No. PCT/IB2022/053545 filed Apr. 14, 2022 and entitled "PRECONFIGURED SMTC AND MEASUREMENT GAPS IN NTN" which claims priority to U.S. Provisional Patent Application No. 63/174,630 filed Apr. 14, 2021, both of which are hereby incorporated by reference in their entirety.

TECHNICAL FIELD

Embodiments of the present disclosure are directed to wireless communications and, more particularly, to preconfigured synchronization signal block (SSB) measurement time configuration (SMTC) and measurement gaps in non-terrestrial networks (NTNs).

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) specifies the evolved packet system (EPS). EPS is based on the long-term evolution (LTE) radio network and the evolved packet core (EPC). EPS was originally intended to provide voice and mobile broadband (MBB) services but has continuously evolved to broaden its functionality. 3GPP also specifies narrowband Internet of Things (NB-IoT) and LTE for machines (LTE-M) as part of the LTE specifications and provide connectivity to massive machine type communications (mMTC) services.

3GPP also specifies the 5G system (5GS). This is a new generation radio access technology intended to serve use cases such as enhanced mobile broadband (eMBB), ultra-reliable and low latency communication (URLLC) and mMTC. 5G includes the new radio (NR) access stratum interface and the 5G Core Network (5GC). The NR physical and higher layers reuse parts of the LTE specification, and to that add needed components when motivated by the new use cases. One such component is a sophisticated framework for beam forming and beam management to extend the support of the 3GPP technologies to a frequency range going beyond 6 GHz.

In 3GPP release 15, 3GPP started the work to prepare NR for operation in a non-terrestrial network (NTN) (e.g., satellite communications). The work was performed within the study item "NR to support Non-Terrestrial Networks" and resulted in TR 38.811. In 3GPP release 16, the work to prepare NR for operation in an NTN network continued with the study item "Solutions for NR to support Non-Terrestrial Network". In parallel the interest to adapt NB-IoT and LTE-M for operation in NTN is growing. As a consequence, 3GPP release 17 contains both a work item on NR NTN and a study item on NB-IoT and LTE-M support for NTN.

A satellite radio access network usually includes the following components: a satellite that refers to a space-borne platform; an earth-based gateway that connects the satellite to a base station or a core network, depending on the choice of architecture; a feeder link that refers to the link between a gateway and a satellite; and an access link that refers to the link between a satellite and a UE.

Depending on the orbit altitude, a satellite may be categorized as low earth orbit (LEO), medium earth orbit (MEO), or geostationary earth orbit (GEO) satellite. LEO includes typical heights ranging from 250-1,500 km, with orbital periods ranging from 90-120 minutes. MEO includes typical heights ranging from 5,000-25,000 km, with orbital periods ranging from 3-15 hours. GEO includes height at about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Two basic architectures have been considered. One is the transparent payload (also referred to as bent pipe architecture). In this architecture, the gNB is located on the ground and the satellite forwards signals/data between the gNB and the UE. Another is the regenerative payload. In this architecture the gNB is located in the satellite. In the work item for NR NTN in 3GPP release 17, only the transparent architecture is considered.

FIG. 1 illustrates an example architecture of a satellite network with bent pipe transponders. The gNB may be integrated in the gateway or connected to the gateway via a terrestrial connection (e.g., wire, optic fiber, wireless link).

Propagation delay is an important aspect of satellite communications that is different from the delay expected in a terrestrial mobile system. For a bent pipe satellite network, the round-trip delay may, due to the orbit height, range from tens of ms in the case of LEO to several hundreds of ms for GEO. This can be compared to the round-trip delays catered for in a cellular network which are limited to 1 ms.

The distance between the user equipment (UE) and a satellite can vary significantly, depending on the position of the satellite and thus the elevation angle ε seen by the UE. Assuming circular orbits, the minimum distance is realized when the satellite is directly above the UE (ε=) 90°, and the maximum distance when the satellite is at the smallest possible elevation angle. Table 1 shows the distances between satellite and UE for different orbital heights and elevation angles together with the one-way propagation delay and the maximum propagation delay difference (the difference towards ε=) 90°. Table 1 assumes regenerative architecture. For the transparent case, the propagation delay between gateway and satellite needs to be considered as well, unless the base station corrects for that.

TABLE 1

Propagation delay for different orbital heights and elevation angles.

| Orbital height | Elevation angle | Distance UE <—> satellite | One-way propagation delay | Propagation delay difference |
|---|---|---|---|---|
| 600 km | 90° | 600 km | 2.0 ms | — |
| | 30° | 1075 km | 3.6 ms | 1.6 ms |
| | 10° | 1932 km | 6.4 ms | 4.4 ms |
| 1200 km | 90° | 1200 km | 4.0 ms | — |
| | 30° | 1999 km | 6.7 ms | 2.7 ms |
| | 10° | 3131 km | 10.4 ms | 6.4 ms |
| 35786 km | 90° | 35786 km | 119.4 ms | — |
| | 30° | 38609 km | 128.8 ms | 9.4 ms |
| | 10° | 40581 km | 135.4 ms | 16.0 ms |

The propagation delay may also be highly variable due to the high velocity of the LEO and MEO satellites and change in the order of 10-100 μs every second, depending on the orbit altitude and satellite velocity.

In the context of propagation delay, the timing advance (TA) the UE uses for its uplink transmissions is essential and has to be much greater than in terrestrial networks for the uplink and downlink to be time aligned at the gNB, as is the case in NR and LTE. One of the purposes of the random access (RA) procedure is to provide the UE with a valid TA (which the network later can adjust based on the reception timing of uplink transmission from the UE). However, even the random access preamble (i.e., the initial message from the UE in the random access procedure) has to be transmitted with a timing advance to allow a reasonable size of the RA preamble reception window in the gNB, but this TA does not have to be as accurate as the TA the UE subsequently uses for other uplink transmissions. The TA the UE uses for the RA preamble transmission is referred to as "pre-compensation TA". Various proposals are considered for how to determine the pre-compensation TA, all of which involves information originating both at the gNB and at the UE.

One proposal is broadcast of a "common TA" which is valid at a certain reference point, e.g., a center point in the cell. The UE then calculates how its own pre-compensation TA deviates from the common TA, based on the difference between the UE's own location and the reference point together with the position of the satellite. Herein, the UE acquires its own position using global navigation satellite system (GNSS) measurements and the UE obtains the satellite position using satellite orbital data (including satellite position at a certain time) broadcast by the network.

Another proposal is the UE autonomously calculates the propagation delay between the UE and the satellite, based on the UE's and the satellite's respective positions, and the network/gNB broadcasts the propagation delay on the feeder link, i.e., the propagation delay between the gNB and the satellite. Herein, the UE acquires its own position using GNSS measurements and the UE obtains the satellite position using satellite orbital data (including satellite position at a certain time) broadcast by the network. The pre-compensation TA is then twice the sum of the propagation delay on the feeder link and the propagation delay between the satellite and the UE.

In another proposal, the gNB broadcasts a timestamp (in SIB9) that the UE compares with a reference timestamp acquired from GNSS. Based on the difference between the two timestamps, the UE can calculate the propagation delay between the gNB and the UE, and the pre-compensation TA is twice as long as this propagation delay.

In conjunction with the random access procedure, the gNB provides the UE with an accurate (i.e., fine-adjusted) TA in the Random Access Response message (in 4-step random access) or MsgB (in 2-step random access) based on the time of reception of the random access preamble. The gNB can subsequently adjust the UE's TA using a Timing Advance Command medium access control (MAC) control element (CE) (or an Absolute Timing Advance Command MAC CE), based on the timing of receptions of uplink transmissions from the UE. A goal of such network control of the UE's timing advance is typically to keep the time error of the UE's uplink transmissions at the gNB's receiver within the cyclic prefix (which is required for correct decoding of the uplink transmissions).

The time advance control framework also includes a time alignment timer with which the gNB configures the UE. The time alignment timer is restarted every time the gNB adjusts the UE's TA, and if the time alignment timer expires, the UE is not allowed to transmit in the uplink without a prior random access procedure (which provides the UE with a valid timing advance). For NTN, 3GPP has also agreed that in addition to the gNB's control of the UE's TA, the UE is allowed to autonomously update its TA based on estimation of changes in the UE-gNB round trip time (RTT) using the UE's location (e.g., obtained from GNSS measurement) and knowledge of the serving satellite's ephemeris data and feeder link delay information from the gNB.

A second relevant aspect is that not only is the propagation delay between the UE and a satellite, or between the UE and a gNB, very long in NTN, but due to the large distances, the difference in propagation delay to two different satellites, or two different gNBs, may be significant on the timescales relevant for cellular communication, including signaling procedures, even when the satellites/gNBs serve neighboring cells. This has an impact on all procedures involving reception or transmission in two cells served by different satellites and/or different gNBs.

A third important aspect closely related to the timing is a Doppler frequency offset induced by the motion of the satellite. The access link may be exposed to Doppler shift on the order of 10-100 kHz in sub-6 GHz frequency band and proportionally higher in higher frequency bands. Also, the Doppler shift is varying, with a rate of up to several hundred Hz per second in the S-band and several kHz per second in the Ka-band.

TR 38.821 specifies that ephemeris data may be provided to the UE, for example, to assist with pointing a directional antenna (or an antenna beam) towards the satellite, and to calculate a correct timing advance and Doppler shift. Broadcasting of ephemeris data in the system information is one option.

A satellite orbit can be fully described using 6 parameters. Which set of parameters is chosen may be decided by the user; many different representations are possible. For example, a choice of parameters used often in astronomy is the set $(a, \varepsilon, i, \Omega, \omega, t)$. Here, the semi-major axis $a$ and the eccentricity $\varepsilon$ describe the shape and size of the orbit ellipse; the inclination $i$, the right ascension of the ascending node $\Omega$, and the argument of periapsis $\omega$ determine its position in space, and the epoch $t$ determines a reference time (e.g., the time when the satellites moves through periapsis). This set of parameters is illustrated in FIG. 2.

A two-line element set (TLE) is a data format encoding a list of orbital elements of an Earth-orbiting object for a given point in time, the epoch. As an example of a different parametrization. TLEs use mean motion $n$ and mean anomaly $M$ instead of $a$ and $t$.

A completely different set of parameters is the position and velocity vector (x, y, z, Vx, Vy, Vz) of a satellite. These are sometimes referred to as orbital state vectors. They can be derived from the orbital elements and vice versa because the information they contain is equivalent. All these formulations (and many others) are possible choices for the format of ephemeris data to be used in NTN.

It is important that a UE can determine the position of a satellite with accuracy of at least a few meters. However, several studies have shown that this might be hard to achieve when using the de-facto standard of TLEs. On the other hand, LEO satellites often have GNSS receivers and can determine their position with some meter level accuracy.

Another item captured in TR 38.821 is the validity time of ephemeris data. Predictions of satellite positions in general degrade with increasing age of the ephemeris data used, due to atmospheric drag, maneuvering of the satellite, imperfections in the orbital models used, etc. Therefore, the publicly available TLE data are updated quite frequently, for example. The update frequency depends on the satellite and its orbit and ranges from weekly to multiple times a day for satellites on very low orbits which are exposed to strong atmospheric drag and need to perform correctional maneuvers often.

While it may be possible to provide the satellite position with the required accuracy, care needs to be taken to meet these requirements, e.g., when choosing the ephemeris data format, or the orbital model to be used for the orbital propagation.

The coverage pattern of NTN is described in section 4.6 of 3GPP TR 38.811 as follows. Satellite or aerial vehicles typically generate several beams over a given area. The footprint of the beams are typically an elliptic shape. The beam footprint may move over the earth with the satellite or the aerial vehicle motion on its orbit. Alternatively, the beam footprint may be earth fixed, in such case beam pointing mechanisms (mechanical or electronic steering feature) may compensate for the satellite or the aerial vehicle motion.

TABLE 2

| Typical beam footprint size | | | |
|---|---|---|---|
| Attributes | GEO | Non-GEO | Aerial |
| Beam footprint size in diameter | 200-1000 km | 100-500 km | 5-200 km |

Typical beam patterns of various NTN access networks are illustrated in FIG. 3. 3GPP TR 38.821 describes scenarios for a NTN as follows. Non-terrestrial network typically features the following elements. NTNs include one or several sat-gateways that connect the NTN to a public data network. A GEO satellite is fed by one or several sat-gateways that are deployed across the satellite targeted coverage (e.g., regional or even continental coverage). UEs in a cell are served by only one sat-gateway. A Non-GEO satellite is served successively by one sat-gateway at a time. The system ensures service and feeder link continuity between the successive serving sat-gateways with sufficient time duration to proceed with mobility anchoring and handover.

Four scenarios are considered as depicted in Table 3 and are detailed in Table 4.

TABLE 3

| Reference scenarios | | |
|---|---|---|
| | Transparent satellite | Regenerative satellite |
| GEO based non-terrestrial access network | Scenario A | Scenario B |
| LEO based non-terrestrial access network | Scenario C | Scenario D |

TABLE 4

| Reference scenario parameters | | |
|---|---|---|
| Scenarios | GEO based non-terrestrial access network (Scenario A and B) | LEO based non-terrestrial access network (Scenario C & D) |
| Orbit type | Notional station keeping position fixed in terms of elevation/azimuth with respect to a given earth point | Circular orbiting around the earth |
| Altitude | 35,786 km | 600 km<br>1,200 km |
| Spectrum (service link) | <6 GHz (e.g., 2 GHz)<br>>6 GHz (e.g., DL 20 GHz, UL 30 GHz) | |
| Max channel bandwidth (service link) | 30 MHz for band < 6 GHz<br>400 MHz for band > 6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes |
| Earth-fixed beams | Yes | Scenario C: No (the beams move with the satellite)<br>Scenario D, option 1: Yes (steering beams), see note 1<br>Scenario D, option 2: No (the beams move with the satellite) |

TABLE 4-continued

| Reference scenario parameters | | |
|---|---|---|
| Scenarios | GEO based non-terrestrial access network (Scenario A and B) | LEO based non-terrestrial access network (Scenario C & D) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude) 3,131 km (1,200 km altitude) |
| Max Round Trip Delay (propagation delay only) | Scenario A: 562 ms (service and feeder links) Scenario B: 281 ms | Scenario C: 25.76 ms (transparent payload: service and feeder links) Scenario D: 12.88 ms (regenerative payload: service link only) |
| Max delay variation within a beam (earth fixed user equipment) | 16 ms | 4.44 ms (600 km) 6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion on the earth | 1000 km/h (e.g., aircraft) | 500 km/h (e.g., high speed train) Possibly 1000 km/h (e.g., aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 4 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

Each satellite has the capability to steer beams towards fixed points on earth using beamforming techniques. This is applicable for a period of time corresponding to the visibility time of the satellite. Max delay variation within a beam (earth fixed user equipment) is calculated based on Min Elevation angle for both gateway and user equipment. Max differential delay within a beam is calculated based on Max beam footprint diameter at nadir.

For scenario D, which is LEO with regenerative payload, both earth-fixed and earth moving beams have been listed. Factoring in the fixed/non-fixed beams results in an additional scenario. The complete list of 5 scenarios in 3GPP TR 38.821 is then:

- Scenario A—GEO, transparent satellite, Earth-fixed beams;
- Scenario B—GEO, regenerative satellite, Earth fixed beams;
- Scenario C—LEO, transparent satellite, Earth-moving beams;
- Scenario D1—LEO, regenerative satellite, Earth-fixed beams;
- Scenario D2—LEO, regenerative satellite, Earth-moving beams.

A global navigation satellite system (GNSS) comprises a set of satellites orbiting the earth in orbits crossing each other, such that the orbits are distributed around the globe. The satellites transmit signals and data that facilitates a receiving device on earth to accurately determine time and frequency references and accurately determine its position, provided that signals are received from a sufficient number of satellites (e.g., four). The position accuracy may typically be in the range of a few meters, but using averaging over multiple measurements, a stationary device may achieve much better accuracy.

A well-known example of a GNSS is the American Global Positioning System (GPS). Other examples are the Russian Global Navigation Satellite System (GLONASS), the Chinese BeiDou Navigation Satellite System and the European Galileo.

The transmissions from GNSS satellites include signals that a receiving device uses to determine the distance to the satellite. By receiving such signals from multiple satellites, the device can determine its position. However, this requires that the device also knows the positions of the satellites. To enable this, the GNSS satellites also transmit data about their own orbits (from which position at a certain time can be derived). In GPS, such information is referred to as ephemeris data and almanac data (or sometimes lumped together under the term navigation information).

The time required to perform a GNSS measurement, e.g. GPS measurement, may vary widely, depending on the circumstances, mainly depending on the status of the ephemeris and almanac data the measuring device has previously acquired (if any). In the worst case, a GPS measurement can take several minutes. GPS uses a bit rate of 50 bps for transmitting its navigation information. The transmission of the GPS date, time and ephemeris information takes 90 seconds. Acquiring the GPS almanac containing orbital information for all satellites in the GPS constellation takes more than 10 minutes. If a UE already possesses this information the synchronization to the GPS signal for acquiring the UE position and Coordinated Universal Time (UTC) is a significantly faster procedure.

3GPP NTN is dependent on GNSS. To handle the timing and frequency synchronization in a NR or LTE based NTN, a promising technique is to equip each device with a GNSS receiver. The GNSS receiver facilitates a device to estimate its geographical position. In one example, a NTN gNB carried by a satellite broadcasts its ephemeris data (i.e., data that informs the UE about the satellite's position, velocity and orbit) to a GNSS equipped UE. The UE can then determine the propagation delay, the delay variation rate, the Doppler shift and its variation rate based on its own location (obtained through GNSS measurements) and the satellite location and movement (derived from the ephemeris data).

The GNSS receiver also facilitates a device to determine a time reference (e.g., in terms of UTC) and frequency reference. This can also be used to handle the timing and frequency synchronization in a NR or LTE based NTN. In a second example, a NTN gNB carried by a satellite broadcasts its timing (e.g., in terms of a Coordinated Universal Time (UTC) timestamp) to a GNSS equipped UE. The UE can then determine the propagation delay, the delay variation rate, the Doppler shift and its variation rate based on its time/frequency reference (obtained through GNSS measurements) and the satellite timing and transmit frequency.

The UE may use this knowledge to compensate its uplink transmissions for the propagation delay and Doppler effect.

GNSS capability in the UE is taken as a working assumption for IoT, NB-IoT and eMTC devices. With this assumption, a UE can estimate and pre-compensate timing and frequency offset with sufficient accuracy for uplink transmission. Simultaneous GNSS and NTN IoT/NB-IoT/eMTC operation is not assumed.

NR also includes SSB-MTC and measurement gaps. NR synchronization signal (SS) consists of primary SS (PSS) and secondary SS (SSS). NR physical broadcast channel (PBCH) carries the basic system information. The combination of SS and PBCH is referred to as SSB in NR. Multiple SSBs are transmitted in a localized burst set. Within an SS burst set, multiple SSBs can be transmitted in different beams. The transmission of SSBs within a localized burst set is confined to a 5 ms window.

The set of possible SSB time locations within an SS burst set depends on the numerology which in most cases is uniquely identified by the frequency band. The SSB periodicity can be configured from the value set {5, 10, 20, 40, 80, 160} ms (where the unit used in the configuration is subframe, which has a duration of 1 ms).

A UE does not need to perform measurements with the same periodicity as the SSB periodicity. Accordingly, the SSB measurement time configuration (SMTC) has been introduced for NR. The signaling of SMTC window informs the UE of the timing and periodicity of SSBs that the UE can use for measurements. The SMTC window periodicity can be configured from the value set {5, 10, 20, 40, 80, 160} ms, matching the possible SSB periodicities. The SMTC window duration can be configured from the value set {1, 2, 3, 4, 5} ms (where the unit used in the configuration is subframe, which has a duration of 1 ms).

The UE may use the same radio frequency (RF) module for measurements of neighboring cells and data transmission in the serving cell. Measurement gaps enable the UE to suspend the data transmission in the serving cell and perform the measurements of neighboring cells. The measurement gap repetition periodicity can be configured from the value set {20, 40, 80, 160} ms, the gap length can be configured from the value set {1.5, 3, 3.5, 4, 5.5, 6} ms. Usually, the measurement gap length is configured to be larger than the SMTC window duration to account for RF retuning time. Measurement gap time advance is also introduced to fine tune the relative position of the measurement gap with respect to the SMTC window. The measurement gap timing advance can be configured from the value set {0, 0.25, 0.5} ms. FIG. 4 illustrates SSB, SMTC window, and measurement gap.

The following is the ASN.1 specification of SMTC in 3GPP TS 38.331 version 16.3.1.

```
SSB-MTC ::=                  SEQUENCE {
  periodicityAndOffset         CHOICE {
    sf5                        INTEGER (0..4),
    sf10                         INTEGER (0..9),
    sf20                         INTEGER (0..19),
    sf40                         INTEGER (0..39),
    sf80                         INTEGER (0..79),
    sf160                        INTEGER (0..159)
  },
  duration                     ENUMERATED { sf1, sf2, sf3, sf4, sf5 }
}
```

| SSB-MTC field descriptions |
|---|
| duration<br>Duration of the measurement window in which to receive SS/PBCH blocks. It is given in number of subframes (see TS 38.213, clause 4.1). |
| periodicityAndOffset<br>Periodicity and offset of the measurement window in which to receive SS/PBCH blocks, see 5.5.2.10. Periodicity and offset are given in number of subframes. |

The following is a description of SMTC configuration from section 5.5.2.10 in 3GPP TS 38.331. The UE shall setup the first SS/PBCH block measurement timing configuration (SMTC) in accordance with the received periodicityAndOffset parameter (providing Periodicity and Offset value for the following condition) in the smtc1 configuration. The first subframe of each SMTC occasion occurs at an SFN and subframe of the NR SpCell meeting the following condition:

```
SFN mod T = (FLOOR (Offset/10));
if the Periodicity is larger than sf5:
   subframe = Offset mod 10;
else:
   subframe = Offset or (Offset +5);
with T = CEIL(Periodicity/10).
```

If smtc2 is present, for cells indicated in the pci-List parameter in smtc2 in the same MeasObjectNR, the UE shall setup an additional SS/PBCH block measurement timing configuration (SMTC) in accordance with the received periodicity parameter in the smtc2 configuration and use the Offset (derived from parameter periodicityAndOffset) and duration parameter from the smtc1 configuration. The first subframe of each SMTC occasion occurs at an SFN and subframe of the NR SpCell meeting the above condition.

If smtc2-LP is present, for cells indicated in the pci-List parameter in smtc2-LP in the same frequency (for intra frequency cell reselection) or different frequency (for inter frequency cell reselection), the UE shall setup an additional SS/PBCH block measurement timing configuration (SMTC) in accordance with the received periodicity parameter in the smtc2-LP configuration and use the Offset (derived from parameter periodicityAndOffset) and duration parameter from the smtc configuration for that frequency. The first subframe of each SMTC occasion occurs at an SFN and subframe of the NR SpCell or serving cell (for cell reselection) meeting the above condition.

On the indicated ssbFrequency, the UE shall not consider SS/PBCH block transmission in subframes outside the SMTC occasion for RRM measurements based on SS/PBCH blocks and for RRM measurements based on CSI-RS except for SFTD measurement (see TS 38.133, subclause 9.3.8).

The following is the ASN.1 specification of measurement gap configuration in 3GPP TS 38.331 version 16.3.1:

```
MeasGapConfig ::=       SEQUENCE {
   gapFR2                  SetupRelease { GapConfig }          OPTIONAL, -- Need M
   ...,
   [[
   gapFR1                  SetupRelease { GapConfig }          OPTIONAL, -- Need M
   gapUE                   SetupRelease { GapConfig }          OPTIONAL, -- Need M
   ]]
}
GapConfig ::=           SEQUENCE {
   gapOffset               INTEGER (0..159),
   mgl                     ENUMERATED { ms1dot5, ms3, ms3dot5, ms4, ms5dot5, ms6},
   mgrp                    ENUMERATED {ms20, ms40, ms80, ms160},
   mgta                    ENUMERATED {ms0, ms0dot25, ms0dot5},
   ...,
   [[
   refServCellindicator    ENUMERATED {pCell, pSCell, mcg-FR2}   OPTIONAL, -- Cond NEDCorNRDC
   ]],
   [[
   refFR2ServCellAsyncCA-r16   ServCellIndex                    OPTIONAL, -- Cond AsyncCA
   mgl-r16                 ENUMERATED {ms10, ms20}             OPTIONAL, -- Cond PRS
   ]]
}
```

| MeasGapConfig field descriptions |
|---|
| gapFR1<br>Indicates measurement gap configuration that applies to FR1 only. In (NG)EN-DC, gapFR1 cannot be set up by NR RRC (i.e., only LTE RRC can configure FR1 measurement gap). In NE-DC, gapFR1 can only be set up by NR RRC (i.e., LTE RRC cannot configure FR1 gap). In NR-DC, gapFR1 can only be set up in the measConfig associated with MCG. gapFR1 cannot be configured together with gapUE. The applicability of the FR1 measurement gap is according to Table 9.1.2-2 and Table 9.1.2-3 in TS 38.133. |
| gapFR2<br>Indicates measurement gap configuration applies to FR2 only. In (NG)EN-DC or NE-DC, gapFR2 can only be set up by NR RRC (i.e., LTE RRC cannot configure FR2 gap). In NR-DC, gapFR2 can only be set up in the measConfig associated with MCG. gapFR2 cannot be configured together with gapUE. The applicability of the FR2 measurement gap is according to Table 9.1.2-2 and Table 9.1.2-3 in TS 38.133. |
| gapUE<br>Indicates measurement gap configuration that applies to all frequencies (FR1 and FR2). In (NG)EN-DC, gapUE cannot be set up by NR RRC (i.e., only LTE RRC can configure per UE measurement gap). In NE-DC, gapUE can only be set up by NR RRC (i.e., LTE RRC cannot configure per UE gap). In NR-DC, gapUE can only be set up in the measConfig associated with MCG. If gapUE is configured, then neither gapFR1 nor gapFR2 can be configured. The applicability of the per UE measurement gap is according to Table 9.1.2-2 and Table 9.1.2-3 in TS 38.133. |

-continued

| MeasGapConfig field descriptions |
|---|
| gapOffset<br>Value gapOffset is the gap offset of the gap pattern with MGRP indicated in the field mgrp. The value range is from 0 to mgrp-1.<br>mgl<br>Value mgl is the measurement gap length in ms of the measurement gap. The measurement gap length is according to in Table 9.1.2-1 in TS 38.133. Value ms1dot5 corresponds to 1.5 ms, ms3 corresponds to 3 ms and so on. If mgl-r16 is present, UE shall ignore the mgl (without suffix).<br>mgrp<br>Value mgrp is measurement gap repetition period in (ms) of the measurement gap. The measurement gap repetition period is according to Table 9.1.2-1 in TS 38.133.<br>mgta<br>Value mgta is the measurement gap timing advance in ms. The applicability of the measurement gap timing advance is according to clause 9.1.2 of TS 38.133. Value ms0 corresponds to 0 ms, ms0dot25 corresponds to 0.25 ms and ms0dot5 corresponds to 0.5 ms. For FR2, the network only configures 0 ms and 0.25 ms.<br>refFR2ServCellIAsyncCA<br>Indicates the FR2 serving cell identifier whose SFN and subframe is used for FR2 gap calculation for this gap pattern with asynchronous CA involving FR2 carrier(s).<br>refServCellIndicator<br>Indicates the serving cell whose SFN and subframe are used for gap calculation for this gap pattern. Value pCell corresponds to the PCell, pSCell corresponds to the PSCell, and mcg-FR2 corresponds to a serving cell on FR2 frequency in MCG. |

| Conditional Presence | Explanation |
|---|---|
| AsyncCA | This field is mandatory present when configuring FR2 gap pattern to UE in:<br>(NG)EN-DC or NR SA with asynchronous CA involving FR2 carrier(s);<br>NE-DC or NR-DC with asynchronous CA involving FR2 carrier(s), if the field refServCellIndicator is set to mcg-FR2.<br>In case the gap pattern to UE in NE-DC and NR-DC is already configured and the serving cell used for the gap calculation corresponds to a serving cell on FR2 frequency in MCG, then the field is optionally present, need M. Otherwise, it is absent, Need R. |
| NEDCorNRDC | This field is mandatory present when configuring gap pattern to UE in NE-DC or NR-DC. In case the gap pattern to UE in NE-DC and NR-DC is already configured, then the field is absent, need M. Otherwise, it is absent. |
| PRS | This field is optionally present, Need R, when configuring gap pattern to UE for measurements of DL-PRS configured via LPP (TS 37.355). Otherwise, it is absent. |

The network may provide a UE in RRC_CONNECTED state with SMTC and measurement gap configuration to facilitate neighbor cell measurements to support, for example, handover decisions in the network.

Rel-17 NR operation may be enhanced (e.g., the SMTC configuration and UE measurement gap configuration) to address the issues associated with the different/larger propagation delays, and the satellites (considering, e.g., their deployment, mobility, height, minimum elevation and prioritizing typical NTN scenarios). Rel-17 NTN includes enhancements of the SMTC configuration and may define optional new UE assistance for the network to properly (re) configure the SMTC and/or measurement gap.

There currently exist certain challenges. For example, SMTC and the different variants thereof efficiently facilitate a UE finding relevant SSB transmissions and limit the SSB search and measurement effort in terrestrial networks. However, the special properties of NTNs impose problems that are not present in terrestrial networks and for which the existing SMTC definition is not adapted to handle.

Compared to terrestrial networks, the distances between sender and transmitter may be very long in NTNs and they may vary significantly depending on the satellite's (or HAPS'/HIBS') position in relation to the UE. In addition, cells in a NTN are typically large, which means that the difference in satellite-UE propagation delay may differ significantly between two different locations in the same cell, e.g., compared to the SMTC offset and duration parameters.

Assuming the SSB/CSI-RS transmissions from different satellites are synchronized and transmitted at the same time, they will still arrive at the UE at different times because of the differences in distance and thus propagation delay.

If an SMTC window and a corresponding measurement gap are configured based on the timing of the serving satellite, SSB/CSI-RS transmissions from other satellites might arrive at the UE outside the configured SMTC measurement window and/or measurement gap, which means that the UE will miss the reference signals and will not be able to perform the measurements.

There is no problem if the length of the SMTC window/measurement gap is large enough so that the transmissions from all satellites fall into the window despite the different propagation delays. According to TR 38.331, a length of up to 5 subframes and 6 subframes can be configured for the SMTC window and measurement gap, respectively. Comparing with the values in Table 1, it can be seen that this is barely enough for the 600 km case. For the 1200 km case, it works only if a minimum elevation angle of 30° is assumed. For GEO, the propagation delay difference is larger than the SMTC window/measurement gap in all cases.

What further complicates the problem is that the propagation delay differences will shift with the movement of the satellites. In the example shown in FIG. 5, there are two satellites S1 and S2, in a 1200 km orbit. At t=0, S1 is directly above the UE while S2 is at an elevation angle of 30°. The propagation delays are 4 ms and 6.7 ms, respectively. Signals transmitted at the same time arrive 2.7 ms earlier from S1 than from S2. At t=1, the UE sees both satellites under an elevation angle of 60°, and the propagation delay is 4.5 ms towards both S1 and S2. At this point, signals transmitted at the same time also arrive at the same time at the UE. Finally, at t=2, the situation is reversed compared to t=0. Now signals from S2 arrive 2.7 ms earlier than from S1 if they are transmitted at the same time.

SUMMARY

Based on the description above, certain challenges currently exist with synchronization signal block (SSB) measurement time configuration (SMTC) and measurement gaps in non-terrestrial networks (NTNs). Certain aspects of the present disclosure and their embodiments may provide solutions to these or other challenges. In particular embodiments, the network, e.g. a gNB, provides a user equipment (UE) with a SMTC and/or a measurement gap configuration, optionally associated with one or more neighbor cell(s), wherein the configuration includes rules for how the configuration(s) should be updated to adapt to the impact of satellite movements in a predictable manner, which enables the UE and the network, e.g. gNB, to stay synchronized in terms of the timing of the SMTC window and/or measurement gap without further signaling between the UE and the network.

In particular embodiments, an SMTC window and/or measurement gap of a configured constant duration is periodically time shifted with a constant time shift. In some embodiments, an SMTC window of a configured constant duration is repeatedly time shifted with a constant time shift wherein each resulting SMTC window (i.e., resulting from each time shift) has an associated validity duration, after which the next time shift is applied. Measurement gap configuration may follow the same principle.

In particular embodiments, an SMTC window of a configured constant duration is periodically time shifted with a variable time shift. Measurement gap configuration may follow the same principle.

In particular embodiments, an SMTC window of a configured constant duration is repeatedly time shifted with a variable time shift wherein each resulting SMTC window (i.e., resulting from each time shift) has an associated (variable) validity duration, after which the next time shift is applied. Measurement gap configuration may follow the same principle.

In particular embodiments, multiple SMTC windows are configured in the form of complete SMTCs, e.g. reusing the SSB-MTC IE, together with a periodicity indicating a periodicity with which switches between the SMTCs are applied. Measurement gap configuration may follow the same principle.

In particular embodiments, multiple SMTC windows are configured in the form of complete SMTCs, e.g. reusing the SSB-MTC IE, wherein each SMTC is associated with a validity duration. Measurement gap configuration may follow the same principle.

The network, e.g. the gNB, may base the dynamic SMTC and/or measurement gap configuration on knowledge of the UE's location and the ephemeris data and feeder link delay of the satellite serving the cell(s) the configuration targets (e.g., cell(s) associated with the configuration). To ensure that the configuration remains valid, the network may configure the UE to report its location if it moves more than a configured maximum distance from the location where the UE received the configuration. Alternatively, or in addition, the UE may be triggered to signal its location to the network when the UE detects that the configured SMTC window and/or measurement gap no longer fully covers the SSB transmissions of the concerned neighbor cell(s), as received by the UE. These mechanisms enable the network to provide the UE with a new configuration before the UE movements cause the concerned SSB transmissions to not be fully covered by the configured SMTC window and/or measurement gap, as seen by the UE.

Furthermore, some of the above listed examples have inherently limited validity time because each of them contains a finite list of pre-configured updates to be applied at specific times. Furthermore, the configurations in some examples may also be associated with limited validity time, e.g. by including in the configuration an indication of a validity time, i.e. the time period during which the configuration is valid (or the validity time may be specified in a standard). When the configuration is no longer valid, the network may provide the UE with a new configuration.

In general, the network, e.g. a gNB, provides a UE with a SMTC and/or a measurement gap configuration, optionally associated with one or more neighbor cell(s), wherein the configuration includes rules for how the configuration(s) should be updated (i.e., pre-configured updates) to adapt to the impact of satellite movements in a predictable manner which enables the UE and the network, e.g. gNB, to stay synchronized in terms of the timing of the SMTC window and/or measurement gap without further signaling between the UE and the network. The UE receives the configuration and applies the pre-configured updates in accordance with the received configuration.

Some embodiments may limit the validity time of a configuration and detect when the configuration becomes invalid because of UE movements, so that the network, e.g. gNB, can provide the UE with a new valid SMTC and/or measurement gap configuration.

According to some embodiments, a method performed by a wireless device comprises receiving a measurement configuration to measure reference signals from one or more satellite cells of a plurality of satellite cells. The measurement configuration includes one or more parameters that indicate how the measurement configuration is to be updated over time. The method further comprises: measuring a reference signal on one or more selected satellite cells using a first measurement configuration based on the received measurement configuration; dynamically adapting the measurement configuration based on the received parameters that indicate how measurement configuration is to be updated resulting in a second measurement configuration; and measuring a reference signal on one or more selected satellite cells using the second measurement configuration.

In particular embodiments, the one or more parameters that indicate how the measurement configuration is to be updated over time are based on ephemeris data associated with the one or more satellite cells.

In particular embodiments, the one or more parameters that indicate how the measurement configuration is to be updated over time are based on a location of the wireless device within the one or more satellite cells.

In particular embodiments, the one or more parameters that indicate how the measurement configuration is to be updated over time comprise a measurement window or measurement gap of a configured constant duration that is periodically time shifted with a constant time shift.

In particular embodiments, the one or more parameters that indicate how the measurement configuration is to be updated over time comprise a measurement window or measurement gap of a configured constant duration that is repeatedly time shifted with a constant time shift wherein each resulting measurement window or measurement gap has an associated validity duration, after which a next time shift is applied.

In particular embodiments, the one or more parameters that indicate how the measurement configuration is to be updated over time comprise a measurement window or measurement gap of a configured constant duration that is periodically time shifted with a variable time shift.

In particular embodiments, the one or more parameters that indicate how the measurement configuration is to be updated over time comprise a measurement window or measurement gap of a configured constant duration that is periodically time shifted with a variable time shift wherein each resulting measurement window or measurement gap has an associated variable validity duration, after which a next time shift is applied.

In particular embodiments, the one or more parameters that indicate how the measurement configuration is to be updated over time comprise multiple measurement windows or measurement gaps configured in the form of complete measurement configurations together with a periodicity indicating a periodicity with which switches between the complete measurement configurations should be applied.

In particular embodiments, the one or more parameters that indicate how the measurement configuration is to be updated over time comprise multiple measurement windows or measurement gaps configured in the form of complete measurement configurations wherein each complete measurement configuration is associated with a validity duration.

In particular embodiments, the measurement configuration comprises at least one of a SMTC and a received signal strength indicator (RSSI) measurement timing configuration (RMTC).

According to some embodiments, a wireless device comprises processing circuitry operable to perform any of the methods of the wireless device described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a network node comprises determining a measurement configuration for a wireless device to measure reference signals from one or more satellite cells of a plurality of satellite cells. The measurement configuration includes one or more parameters that indicate how the measurement configuration is to be updated over time. The method further comprises transmitting the measurement configuration to the wireless device.

In particular embodiments, the one or more parameters that indicate how the measurement configuration is to be updated over time are based on ephemeris data associated with the one or more satellite cells.

In particular embodiments, the one or more parameters that indicate how the measurement configuration is to be updated over time are based on a location of the wireless device within the one or more satellite cells.

In particular embodiments, the one or more parameters that indicate how the measurement configuration is to be updated over time comprise a measurement window or measurement gap of a configured constant duration that is periodically time shifted with a constant time shift.

In particular embodiments, the one or more parameters that indicate how the measurement configuration is to be updated over time comprise a measurement window or measurement gap of a configured constant duration that is repeatedly time shifted with a constant time shift wherein each resulting measurement window or measurement gap has an associated validity duration, after which a next time shift is applied.

In particular embodiments, the one or more parameters that indicate how the measurement configuration is to be updated over time comprise a measurement window or measurement gap of a configured constant duration that is periodically time shifted with a variable time shift.

In particular embodiments, the one or more parameters that indicate how the measurement configuration is to be updated over time comprise a measurement window or measurement gap of a configured constant duration that is periodically time shifted with a variable time shift wherein each resulting measurement window or measurement gap has an associated variable validity duration, after which a next time shift is applied.

In particular embodiments, the one or more parameters that indicate how the measurement configuration is to be updated over time comprise multiple measurement windows or measurement gaps configured in the form of complete measurement configurations together with a periodicity indicating a periodicity with which switches between the complete measurement configurations should be applied.

In particular embodiments, the one or more parameters that indicate how the measurement configuration is to be updated over time comprise multiple measurement windows or measurement gaps configured in the form of complete measurement configurations wherein each complete measurement configuration is associated with a validity duration.

In particular embodiments, the measurement configuration comprises at least one of a SMTC and a RMTC.

According to some embodiments, a network node network node comprises processing circuitry operable to perform any of the network node methods described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments provide enhancements in terms of the trade-off between flexibility and explicit details or methods for the realization of the configuration.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
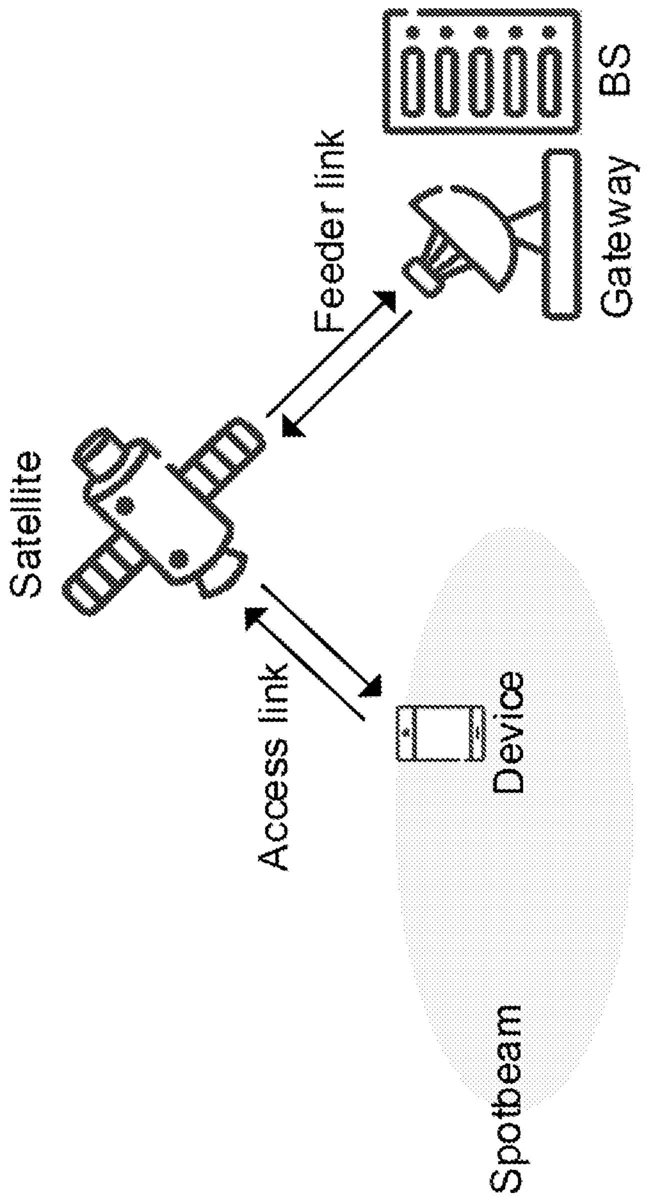
FIG. 1 illustrates an example architecture of a satellite network with bent pipe transponders.
Figure 2:
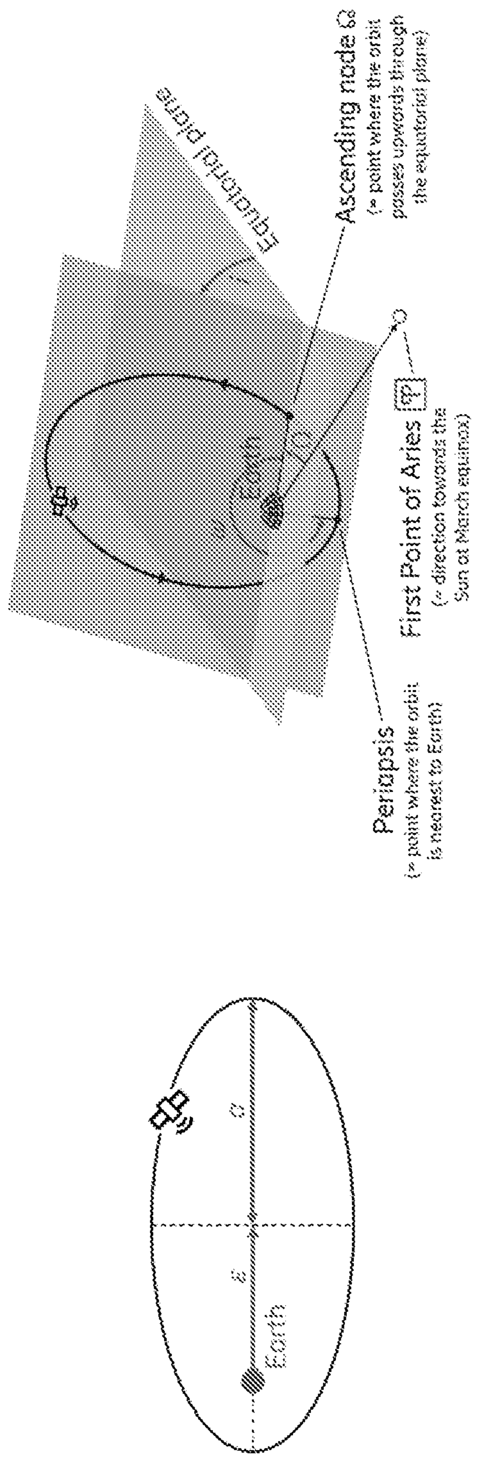
FIG. 2 illustrates orbital elements for describing a satellite orbit.
Figure 3:
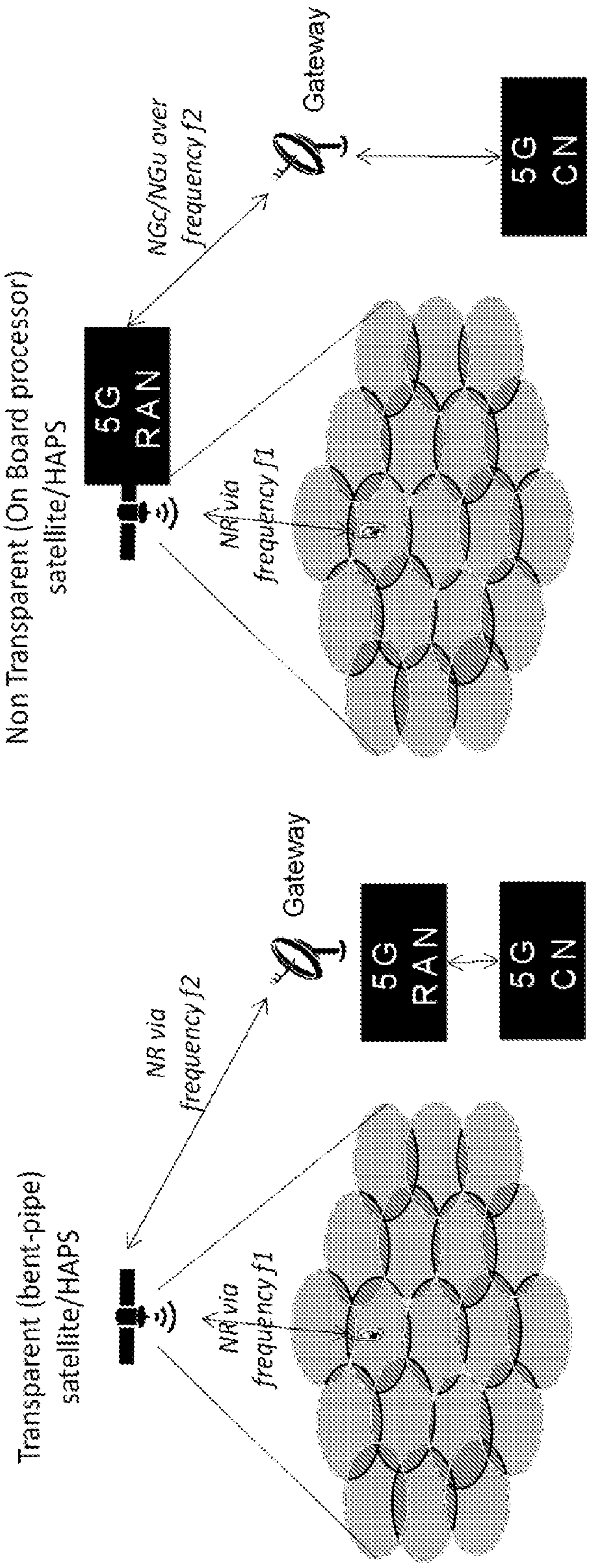
FIG. 3 illustrates NTN beam patterns.
Figure 4:
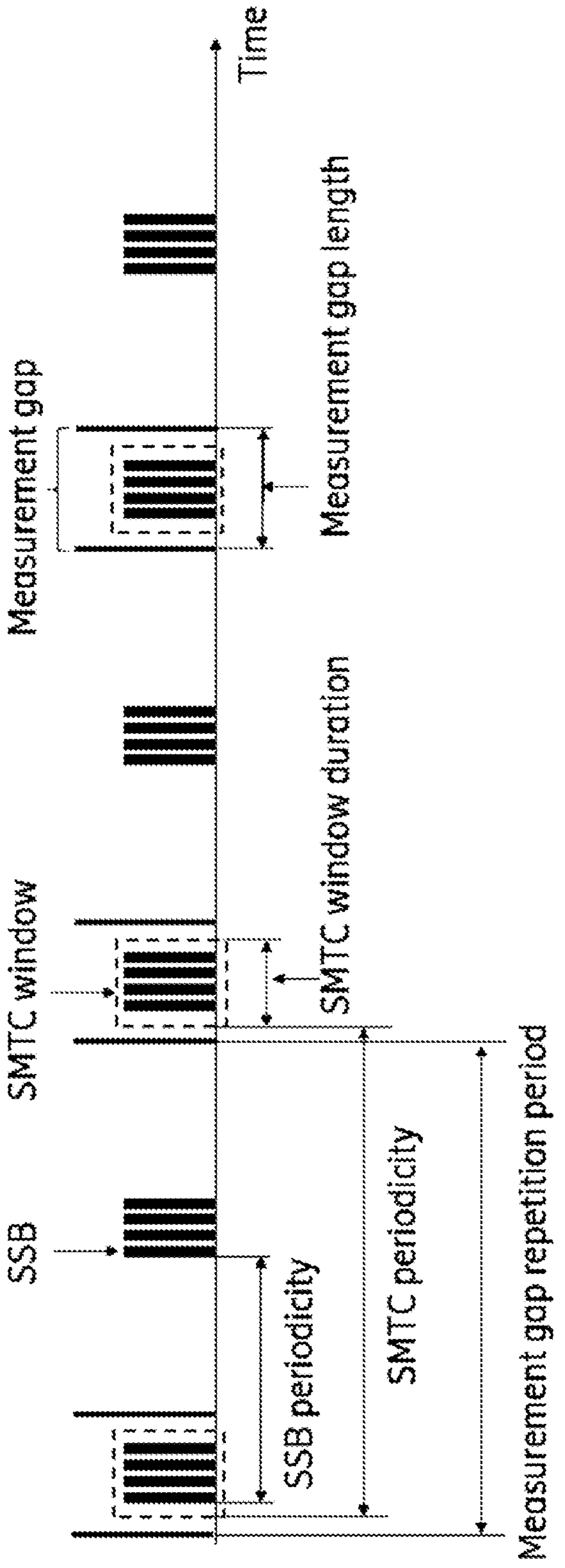
FIG. 4 illustrates SSB, SMTC window, and measurement gap.
Figure 5:
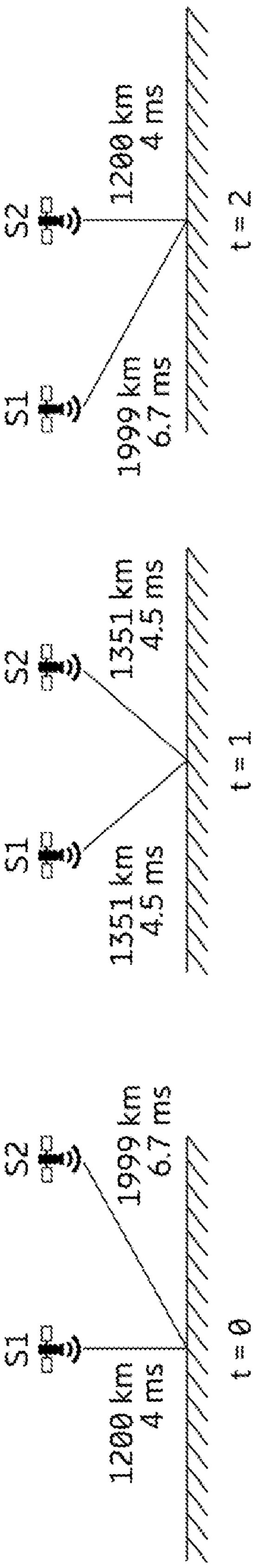
FIG. 5 illustrates an example of propagation delay differences from different satellites.

As described above, certain challenges currently exist with synchronization signal block (SSB) measurement time configuration (SMTC) and measurement gaps in non-terrestrial networks (NTNs). Certain aspects of the present disclosure and their embodiments may provide solutions to these or other challenges. In particular embodiments, the network, e.g. a gNB, provides a user equipment (UE) with a SMTC and/or a measurement gap configuration, optionally associated with one or more neighbor cell(s), wherein the configuration includes rules for how the configuration(s) should be updated to adapt to the impact of satellite movements in a predictable manner, which enables the UE and the network, e.g. gNB, to stay synchronized in terms of the timing of the SMTC window and/or measurement gap without further signaling between the UE and the network.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments outlined below are described mainly in terms of new radio (NR) based NTNs, but they are equally applicable in a NTN based on long term evolution (LTE) technology or any other radio access technology (RAT) where measurement windows and gaps may be configured.

Particular examples focus on SMTC and SMTC window configuration and corresponding measurement gaps, but embodiments are equally applicable if the SMTC configuration is replaced by RMTC (RSSI Measurement Timing Configuration) or measurement timing configuration for any other reference signal or other type of measurable signal (e.g., a signal suitable for channel quality measurement).

Particular embodiments address the problems described above. In particular embodiments, the network, e.g. a gNB, provides a UE with a SMTC and/or a measurement gap configuration, optionally associated with one or more neighbor cell(s), wherein the configuration includes rules for how the configuration(s) should be updated to adapt to the impact of satellite movements in a predictable manner which enables the UE and the network, e.g. gNB, to stay synchronized in terms of the timing of the SMTC window and/or measurement gap without further signaling between the UE and the network.

The UE receives the configuration and applies the pre-configured updates according to the received configuration. Such a SMTC window configuration could be referred to as a dynamic SMTC window configuration or a dynamic SMTC. Similarly, a measurement gap configuration including pre-configured updates may be referred to as a dynamic measurement gap configuration.

The configuration of an SMTC window and/or a measurement gap, including pre-configured updates can be realized in various ways, which are described in a number of example embodiments. Some embodiments may extend the range/set of configurable SMTC window durations (i.e., the duration parameter in the SSB-MTC IE) to, e.g. 1 ms, 2 ms, 3 ms, 4 ms, 5 ms, 6 ms, 7 ms, 8 ms, 9 ms, 10 ms, 12 ms, 14 ms, 16 ms, 18 ms and 20 ms. Similarly, some embodiments extend the range/set of configurable measurement gap lengths (i.e., the mgl parameter in the GapConfig IE) to, e.g. 1.5 ms, 3 ms. 3.5 ms, 4 ms, 5.5 ms, 6 ms, 6.5 ms, 7.5 ms, 8.5 ms, 9.5 ms, 10 ms, 10.5 ms, 12.5 ms, 14.5 ms, 16.5 ms, 18.5 ms, 20 ms and 20.5 ms.

The extended range of configurable SMTC window durations enables the network, e.g. the gNB, to configure extra margin in the window so that the time of reception of the SSB transmissions, due to satellite movements, can slide within the SMTC window for some time before the SMTC window has to be updated/shifted/switched.

The network, e.g. the gNB, may base the dynamic SMTC and/or measurement gap configuration on knowledge of the UE location and the ephemeris data and feeder link delay of the satellite serving the cell(s) the configuration targets (e.g., cell(s) associated with the configuration). If the network/gNB, at the time when the configuration is to be created, does not have fresh or accurate enough information about the UE location, the network/gNB may request the UE to signal the UE location to the network.

As one option, the UE responds with its location in terms of geographical coordinates. In another option, the UE is configured with location or distance units in a predefined metric, like "X meters" and the UE reports how many of "X meters" units the UE has moved from the location where the UE was when it received the configuration (where X may be e.g. 2, 10, 100 or 1000).

Furthermore, the network may configure whether the UE should also include the direction in which it has moved. As one example, the UE may be configured to use a one bit indication if the UE has moved in a certain direction. Or the direction is expressed with n bits, for example 2 bits can be used to indicate south, north, east or west. The UE might be configured to provide the information in UE assistance information signaling.

The location information the UE signals to the network may be based on any means that is available to the UE for determination of the location, such as GNSS measurements, potentially complemented by movement tracking based on UE internal sensors such as accelerometer(s), gyroscope(s) and possibly a compass.

When applicable, the network, e.g. the gNB, may provide the UE with multiple dynamic SMTC and/or measurement gap configurations, wherein each SMTC and/or measurement gap configuration is associated with a group of cells served by the same satellite. An alternative to the optional association of a SMTC and/or measurement gap configuration with a group of cells is to optionally associate the configuration with a satellite identifier. No such satellite identifier is currently specified, or agreed to be specified, so to support such an association, some embodiments may include a satellite identifier and the satellite identifier may be broadcast in the cell(s) the satellite serves, e.g., in the broadcast system information.

In a first group of embodiments, an SMTC window of a configured constant duration is periodically time shifted with a constant time shift. Thus, the complete SMTC configuration (including the pre-configured updates) consists of an initial SMTC window (which includes duration (i.e., window length), periodicity and offset (i.e., start indication)), a time shift to apply to the initial start indication and a periodicity or time interval to be applied between two successive applications of the time shift.

As an example, this may be realized as follows in ASN.1 code.

```
GapConfigNTN ::=          SEQUENCE {
  initialGapConfig          GapConfig,
  timeShift                 INTEGER,
  shiftPeriodicity          INTEGER
}
```

In the above, timeShift may be expressed, e.g., in milliseconds, subframes or slots and shiftPeriodicity may be expressed, e.g., in seconds.

Similarly, as for the SSB-MTC-NTN IE definition above, a list of associated cells may optionally be included in the GapConfigNTN IE or optionally such an association could be made outside the GapConfigNTN IE, e.g., in the MeasGapConfig IE or in a separate IE included in the MeasGapConfig IE, e.g., realized as the following example ASN.1 code.

```
MeasGapConfig ::=    SEQUENCE {                          OPTIONAL, -- Need M
  gapFR2               SetupRelease { GapConfig }
  ...,
[[
  gapFR1               SetupRelease { GapConfig }        OPTIONAL, -- Need M
  gapUE                SetupRelease { GapConfig }        OPTIONAL  -- Need M
  ]],
  [[
  GapNTN               SetupRelease { GapNTN-Config }    OPTIONAL  -- Need M
  ]]
}
GapNTN-Config ::=    SEQUENCE {
  gapConfigNTN         GapConfigNTN,
  applicableCells      PCI-List
}
```

In a second group of embodiments, an SMTC window of a configured constant duration is repeatedly time shifted with a constant time shift wherein each resulting SMTC window (i.e., resulting from each time shift) has an associated validity duration, after which the next time shift is applied. Thus, the complete dynamic SMTC window configuration (including the pre-configured updates) consists of an initial SMTC window (which includes duration (i.e., window length), periodicity and offset (i.e., start indication)), a time shift and a set of time shift validity durations.

As an example, this may be realized as follows in ASN.1 code.

```
SSB-MTC-NTN ::=      SEQUENCE {
   initialSMTC          SSB-MTC,
   timeShift            INTEGER,
   validityDuration     SEQUENCE (SIZE
                        (1..maxNumberOfPreConfWindows))
                        OF INTEGER
}
```

In the above, timeShift may be expressed, e.g., in milliseconds, subframes or slots and the validityDuration values may be expressed, e.g., in seconds. The first validityDuration value is applied to the initial SMTC window and when this validityDuration expires, the time shift is applied a first time. The second validityDuration value is applied after the first time shift and when this validityDuration expires, the time shift is applied a second time, etc.

Furthermore, a list of cells that the dynamic SMTC is associated with may be included in the SSB-MTC-NTN or such an association may be indicated in any of the other previously described ways (including absence of explicit indication).

The dynamic measurement gap configuration may follow the same principle and may be realized in a similar way, e.g., as in the following example ASN.1 code.

```
GapConfigNTN ::=   SEQUENCE {
   initialGapConfig   GapConfig,
   timeShift          INTEGER,
   validityDuration   SEQUENCE (SIZE
                      (1..maxNumberOfPreConfGaps)) OF INTEGER
}
```

Possible units for timeShift and ValidityDuration values as well as the application of the time shift and the validityDuration values are the same as above.

Similarly, as for the SSB-MTC-NTN IE definition above, a list of associated cells may optionally be included in the GapConfigNTN IE or optionally such an association may be made in any of the other previously described ways.

As a variation of these embodiments, the sequence of validityDuration values may be replaced by a sequence of shift execution time indications, where each such indication indicates when the execution of a time shift should take place. Such a time indication could be expressed, e.g., in terms of system frame number (SFN) and possibly slot number (and even symbol number) together with an indication of the number of SFN cycles (i.e., the number of times the SFN value range has wrapped around) since the configuration was provided to the UE.

In a third group of embodiments, an SMTC window of a configured constant duration is periodically time shifted with a variable time shift where "periodically" means that each resulting SMTC window (i.e., resulting from each time shift) has the same associated validity duration, after which the next time shift is applied. Thus, the complete dynamic SMTC window configuration (including the pre-configured updates) consists of an initial SMTC window (which includes duration (i.e., window length), periodicity and offset (i.e., start indication)), a validity duration (applicable after each time shift) and a set of time shifts.

As an example, this may be realized as follows in ASN.1 code.

```
SSB-MTC-NTN ::=      SEQUENCE {
   initialSMTC          SSB-MTC,
   validityDuration     INTEGER,
   timeShift            SEQUENCE (SIZE
                        (1..maxNumberOfTimeShifts)) OF INTEGER
}
```

In the above, validityDuration may be expressed, e.g., in seconds and the timeShift values may be expressed, e.g., in milliseconds, subframes or slots. The first time shift is applied when the initial SMTC window has been valid for a time equal to validityDuration. Then the SMTC window resulting from the first time shift is valid for a time equal to validityDuration and then the second time shift is applied, etc. Optionally, a periodicity parameter may be used instead of a validityDuration parameter.

Furthermore, a list of cells that the dynamic SMTC is associated with may be included in the SSB-MTC-NTN or such an association may be indicated in any of the other previously described ways (including absence of explicit indication).

The dynamic measurement gap configuration may follow the same principle and may be realized in a similar way, e.g., as in the following example ASN.1 code.

```
GapConfigNTN ::=      SEQUENCE {
   initialGapConfig      GapConfig,
   validityDuration      INTEGER,
   timeShift             SEQUENCE (SIZE
                         (1..maxNoOfTimeShifts)) OF INTEGER
}
```

Possible units for the validityDuration and the timeShift values as well as the application of the time shifts and the validityDuration are the same as above.

Similarly, as for the SSB-MTC-NTN IE definition above, a list of associated cells may optionally be included in the GapConfigNTN IE or optionally such an association may be made in any of the other previously described ways.

In a fourth group of embodiments, an SMTC window of a configured constant duration is repeatedly time shifted with a variable time shift wherein each resulting SMTC window (i.e., resulting from each time shift) has an associated (variable) validity duration, after which the next time shift is applied. Thus, the complete dynamic SMTC window configuration (including the pre-configured updates) consists of an initial SMTC window (which includes duration (i.e., window length), periodicity and offset (i.e., start indication)), and a set of time shifts with associated validity durations.

As an example, this may be realized as follows in ASN.1 code.

```
SSB-MTC-NTN ::=            SEQUENCE {
  initialSMTC                SSB-MTC,
  timeShiftedWindows         SEQUENCE (SIZE
                             (1..maxNoOfTimeShifts))
                             OF TimeShiftedWindow
}
TimeShiftedWindow ::=      SEQUENCE {
  timeShift                  INTEGER,
  validityDuration           INTEGER
}
```

In the above, timeShift may be expressed, e.g., in milliseconds, subframes or slots and validityDuration may be expressed, e.g., in seconds. The initial SMTC window is valid for a time equal to the first validityDuration value and then the first time shift is applied. After the first time shift, the resulting SMTC window is valid for a time equal to the second validityDuration value and when this validityDuration expires, the second time shift is applied, etc.

Furthermore, a list of cells that the dynamic SMTC is associated with may be included in the SSB-MTC-NTN IE or such an association may be indicated in any of the other previously described ways (including absence of explicit indication).

The dynamic measurement gap configuration may follow the same principle and may be realized in a similar way, e.g., as in the following example ASN.1 code.

```
GapConfigNTN ::=        SEQUENCE {
  initialGapConfig        GapConfig,
  timeShiftedGaps         SEQUENCE (SIZE (1..maxNoOfTimeShifts))
                          OF TimeShiftedGap
}
TimeShiftedGap ::=      SEQUENCE {
  timeShift               INTEGER,
  validityDuration        INTEGER
}
```

Possible units for timeShift values and ValidityDuration values as well as the application of the time shifts and the validityDuration values are the same as above.

Similarly, as for the SSB-MTC-NTN IE definition above, a list of associated cells may optionally be included in the GapConfigNTN IE or optionally such an association may be made in any of the other previously described ways.

As a variation of these embodiments, the sequence of validityDuration values may be replaced by a sequence of shift execution time indications, where each such indication indicates when the execution of a time shift should take place. Such a time indication could be expressed, e.g., in terms of SFN and possibly slot number (and even symbol number) together with an indication of the number of SFN cycles (i.e., the number of times the SFN value range has wrapped around) since the configuration was provided to the UE.

In a fifth group of embodiments, multiple SMTC windows are configured in the form of complete SMTCs, e.g., reusing the SSB-MTC IE, together with a periodicity indicating a periodicity with which switches between the SMTCs should be applied. That is the multiple SMTCs should be applied sequentially, each of them being valid a time period indicated by the periodicity. For example, N SMTCs ($SMTC_1$, $SMTC_2$, . . . . $SMTC_N$) may be configured, wherein these SMTCs are sequentially applied where the switches between them occur with a configured periodicity P. That is, initially, $SMTC_1$ is valid during a time period P, then $SMTC_2$ is valid during a subsequent time period P, etc. After each time period P, the UE switches from $SMTC_K$ to $SMTC_{K+1}$, where K is an index between 1 and N−1.

To realize this, a complete dynamic SMTC may include a set of SMTCs and a periodicity parameter. This may, for example, be realized in ASN.1 code as follows.

```
SSB-MTC-NTN ::=     SEQUENCE {
  preConfigSMTC       SEQUENCE (SIZE
                      (1..maxNoOfPreConfSMTC)) OF SSM-MTC,
  periodicity         INTEGER
}
```

The periodicity parameter may, e.g., be expressed in seconds.

Furthermore, a list of cells that the dynamic SMTC is associated with may be included in the SSB-MTC-NTN IE or such an association may be indicated in any of the other previously described ways (including absence of explicit indication).

The dynamic measurement gap configuration may follow the same principle and may be realized in a similar way, e.g., as in the following example ASN.1 code.

```
GapConfigNTN ::=          SEQUENCE {
  preConfigGapConfig        SEQUENCE (SIZE
                            (1..maxNoOfPreConfGapConfig))
                            OF GapConfig,
  periodicity               INTEGER
}
```

As for the SSB-MTC-NTN IE above, the periodicity parameter may, e.g., be expressed in seconds.

Similarly, as for the SSB-MTC-NTN IE definition above, a list of associated cells may optionally be included in the GapConfigNTN IE or optionally such an association may be made in any of the other previously described ways.

In a sixth group of embodiments, multiple SMTC windows are configured in the form of complete SMTCs, e.g., reusing the SSB-MTC IE, wherein each SMTC is associated with a validity duration. The multiple SMTCs may be applied sequentially, each of them being valid a time period indicated by its associated validity duration. For instance, N SMTCs ($SMTC_1$, $SMTC_2$, . . . $SMTC_N$), each being associated with a respective one of N validity duration values ($validityDuration_1$, $validityDuration_2$, . . . $validityDuration_N$), may be configured, and the UE initially applies $SMTC_1$ during a time period equal to $validityDuration_1$, then the UE applies $SMTC_2$ during a time period equal to $validityDuration_2$, etc.

To realize this, a complete dynamic SMTC may include a set of SMTCs, each with an associated validity duration parameter. This may, for example, be realized in ASN.1 code as follows.

```
SSB-MTC-NTN ::=         SEQUENCE (1..maxNoOfPreConfSMTC))
                        OF PreConfigSMTC
PreConfigSMTC ::=       SEQUENCE {
  preConfigSMTC           SSB-MTC,
  validityDuration        INTEGER
}
```

Another, alternative example ASN.1 code definition may be as follows.

```
SSB-MTC-NTN ::=      SEQUENCE {
  preConfigSMTC        SEQUENCE (SIZE
                       (1..maxNoOfPreConfSMTC)) OF SSB-SMTC,
  validityDuration     SEQUENCE (SIZE
                       (1..maxNoOfPreConfSMTC)) OF INTEGER
}
```

The validityDuration parameter values may, e.g., be expressed in seconds.

Furthermore, a list of cells that the dynamic SMTC is associated with may be included in the SSB-MTC-NTN IE or such an association may be indicated in any of the other previously described ways (including absence of explicit indication).

The dynamic measurement gap configuration may follow the same principle and may be realized in a similar way, e.g., as in the following example ASN.1 code.

```
GapConfigNTN ::=          SEQUENCE (1..maxNoOfPreConfGapConfig))
                          OF PreConfigGapConfig
PreConfigGapConfig ::=      SEQUENCE {
  preConfigGapConfig          GapConfig,
  validityDuration            INTEGER
}
```

Or as an alternative ASN.1 code example as follows.

```
  GapConfigNTN ::=         SEQUENCE {
    preConfigGapConfig       SEQUENCE (SIZE
                             (1..maxNoOfPreConfGapConfig))
                             OF GapConfig,
    validityDuration         SEQUENCE (SIZE
                             (1..maxNoOfPreConfGapConfig))
                             OF INTEGER
  }
```

Similarly, as for the SSB-MTC-NTN IE definition above, a list of associated cells may optionally be included in the GapConfigNTN IE or optionally such an association may be made in any of the other previously described ways.

As a variation of these embodiments, the validityDuration values may be replaced by switch execution time indications, where each such indication indicates when the UE should switch from one SMTC (or measurement gap configuration, e.g., GapConfig) to the next (e.g., from $SMTC_K$ to $SMTC_{K+1}$, where K is an index between 1 and N−1 (and N configured SMTCs are assumed)). Such a time indication may be expressed, e.g., in terms of SFN and possibly slot number (and even symbol number) together with an indication of the number of SFN cycles (i.e., the number of times the SFN value range has wrapped around) since the configuration was provided to the UE.

Some of the above listed embodiments have inherently limited validity times because each of them contains a finite list of pre-configured updates to be applied at specific times and valid during a configured time. Furthermore, the configurations in the other embodiments may also be associated with limited validity times, e.g., by including in the configuration an indication of a validity time, i.e., the time period during which the configuration is valid (or this validity time may be specified in a standard). When the configuration is no longer valid, or slightly before is validity time expires, the network may provide the UE with a new and valid configuration.

Another way that the configuration may become invalidated is that the UE moves such a long distance that the configured SMTC window and/or measurement gap no longer fully covers the SSB transmissions of the concerned neighbor cell(s), as received by the UE. If this happens (or when this situation is imminent), the UE may inform the network of its new location, so that the network can provide the UE with a new configuration, or new configurations, including SMTC and/or measurement gap configuration.

To ensure that the UE proactively reports its new location to the network before the UE movement has made the configuration invalid, the network may configure a condition which triggers the UE to report its location to the network when the condition is fulfilled. Such a condition may, e.g., be that the distance the UE has moved since it received the configuration (measured along a straight line between the UE location and the location the UE had when it received the configuration) has exceeded a threshold distance $D_{threshold}$.

As an alternative, the distance may be measured along a straight line between the UE location and the last location the UE reported to the network. This alternative distance measure may be preferable if the network bases the configuration on a UE location which is not entirely fresh, i.e., a location the UE may have provided some non-negligible time prior to the time of configuration. Alternatively, or in addition, the UE may be triggered to signal its location to the network when the UE detects that the configured SMTC window and/or measurement gap no longer fully covers the SSB transmissions of the concerned neighbor cell(s), as received by the UE.

Various combinations of the above embodiments, or periodization of the validity of multiple configurations, or complex configurations using principles from different options, are feasible. As one example, a first configuration according to the first group of embodiments may be used during a first time period T1, then a second configuration according to the first group of embodiments is valid during a second time period T2, etc. In another example, a configuration in accordance with the third group of embodiments is valid during a first timer period T1 and then a configuration in accordance with the fourth group of embodiments is valid during a second time period T2.

The herein described embodiments and additional mechanism related to SMTC may also be applied to RSSI measurement timing configuration (RMTC).

Figure 6:
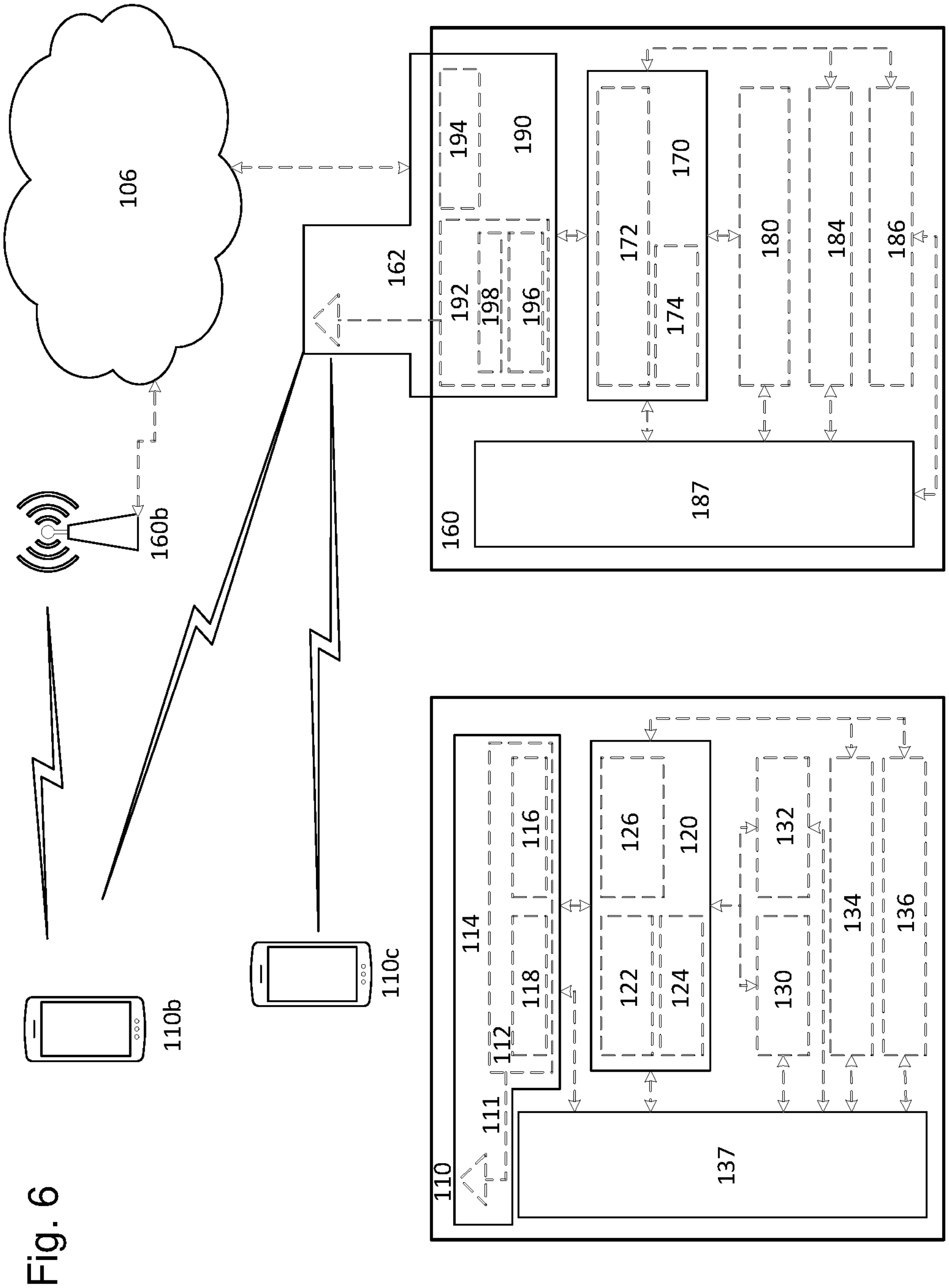
FIG. 6 is a block diagram illustrating an example wireless network.

FIG. 6 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 160 includes processing circuitry 170, device readable medium 180, interface 190, auxiliary equipment 184, power source 186, power circuitry 187, and antenna 162. Although network node 160 illustrated in the example wireless network of FIG. 6 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 6 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 6. For simplicity, the wireless network of FIG. 6 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device.

Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 7:
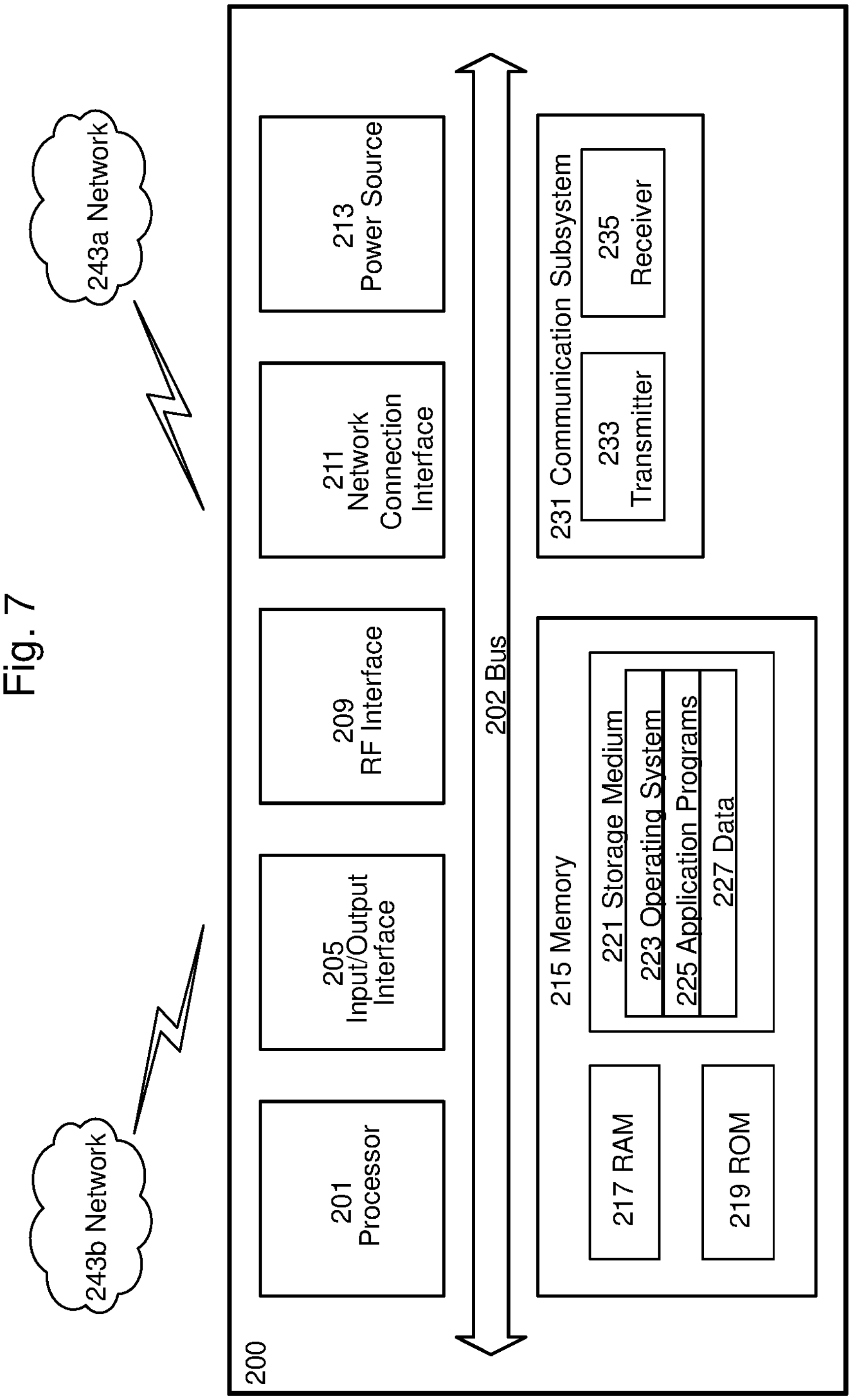
FIG. 7 illustrates an example user equipment, according to certain embodiments.

FIG. 7 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 7 is a UE, the components discussed herein are equally applicable to a WD, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7. RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
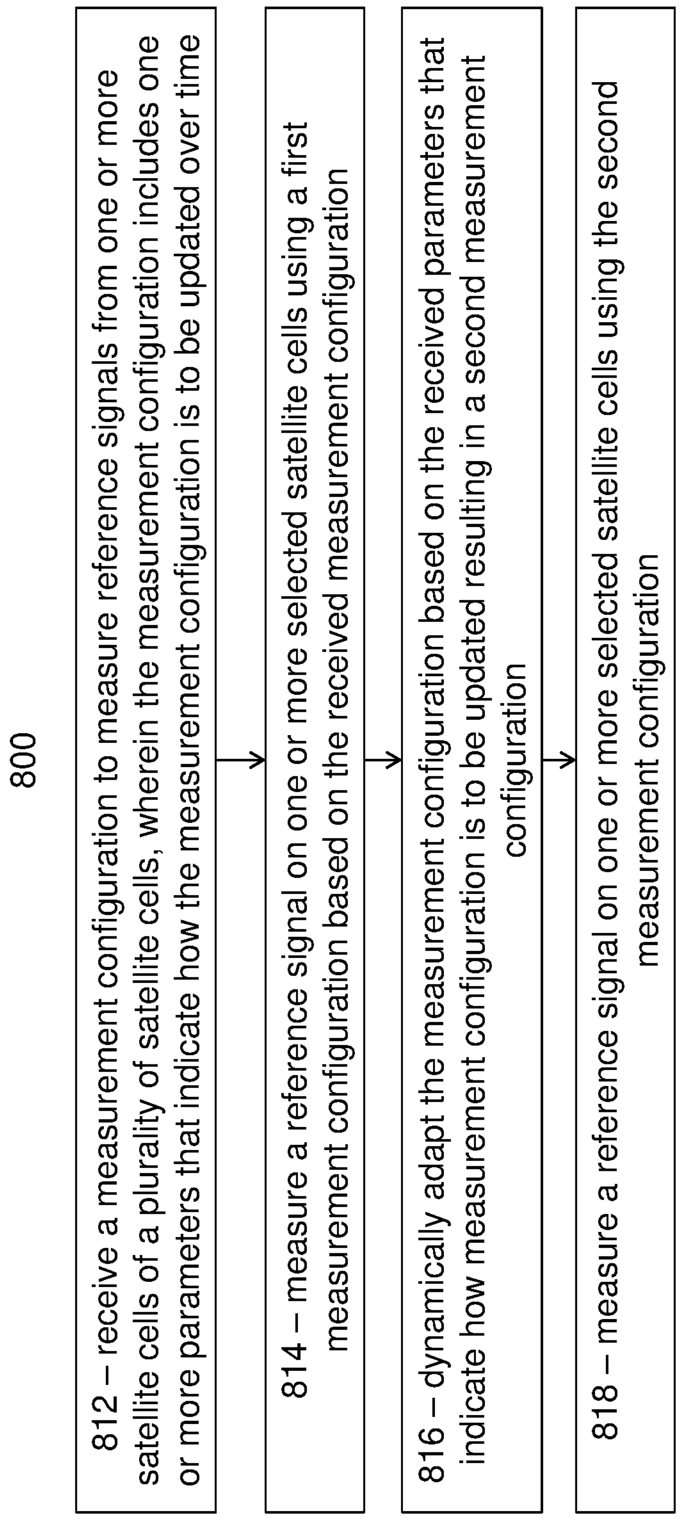
FIG. 8 is flowchart illustrating an example method in a wireless device, according to certain embodiments.

FIG. 8 is a flowchart illustrating an example method in a wireless device, according to certain embodiments. In particular embodiments, one or more steps of FIG. 8 may be performed by wireless device 110 described with respect to FIG. 6.

The method begins at step 812, where the wireless device (e.g., wireless device 110) receives a measurement configuration to measure reference signals from one or more satellite cells of a plurality of satellite cells. The measurement configuration includes one or more parameters that indicate how the measurement configuration is to be updated over time.

In particular embodiments, the one or more parameters that indicate how the measurement configuration is to be updated over time are based on ephemeris data associated with the one or more satellite cells.

In particular embodiments, the one or more parameters that indicate how the measurement configuration is to be updated over time are based on a location of the wireless device within the one or more satellite cells.

In particular embodiments, the one or more parameters that indicate how the measurement configuration is to be updated over time comprise a measurement window or measurement gap of a configured constant duration that is periodically time shifted with a constant time shift.

In particular embodiments, the one or more parameters that indicate how the measurement configuration is to be updated over time comprise a measurement window or measurement gap of a configured constant duration that is repeatedly time shifted with a constant time shift wherein each resulting measurement window or measurement gap has an associated validity duration, after which a next time shift is applied.

In particular embodiments, the one or more parameters that indicate how the measurement configuration is to be updated over time comprise a measurement window or measurement gap of a configured constant duration that is periodically time shifted with a variable time shift.

In particular embodiments, the one or more parameters that indicate how the measurement configuration is to be updated over time comprise a measurement window or measurement gap of a configured constant duration that is periodically time shifted with a variable time shift wherein each resulting measurement window or measurement gap has an associated variable validity duration, after which a next time shift is applied.

In particular embodiments, the one or more parameters that indicate how the measurement configuration is to be updated over time comprise multiple measurement windows or measurement gaps configured in the form of complete measurement configurations together with a periodicity indicating a periodicity with which switches between the complete measurement configurations should be applied.

In particular embodiments, the one or more parameters that indicate how the measurement configuration is to be updated over time comprise multiple measurement windows or measurement gaps configured in the form of complete measurement configurations wherein each complete measurement configuration is associated with a validity duration.

In particular embodiments, the measurement configuration comprises at least one of a SMTC and a RMTC.

At step 814, the wireless device measuring a reference signal on one or more selected satellite cells using a first measurement configuration based on the received measurement configuration;

At step 816, the wireless device dynamically adapts the measurement configuration based on the received parameters that indicate how measurement configuration is to be updated resulting in a second measurement configuration. For example, the wireless device may shift a measurement window and/or measurement gap in time according to any of the embodiments and examples described herein.

At step 818, the wireless device measures a reference signal on one or more selected satellite cells using the second measurement configuration.

Modifications, additions, or omissions may be made to method 800 of FIG. 8. Additionally, one or more steps in the method of FIG. 8 may be performed in parallel or in any suitable order.

Figure 9:
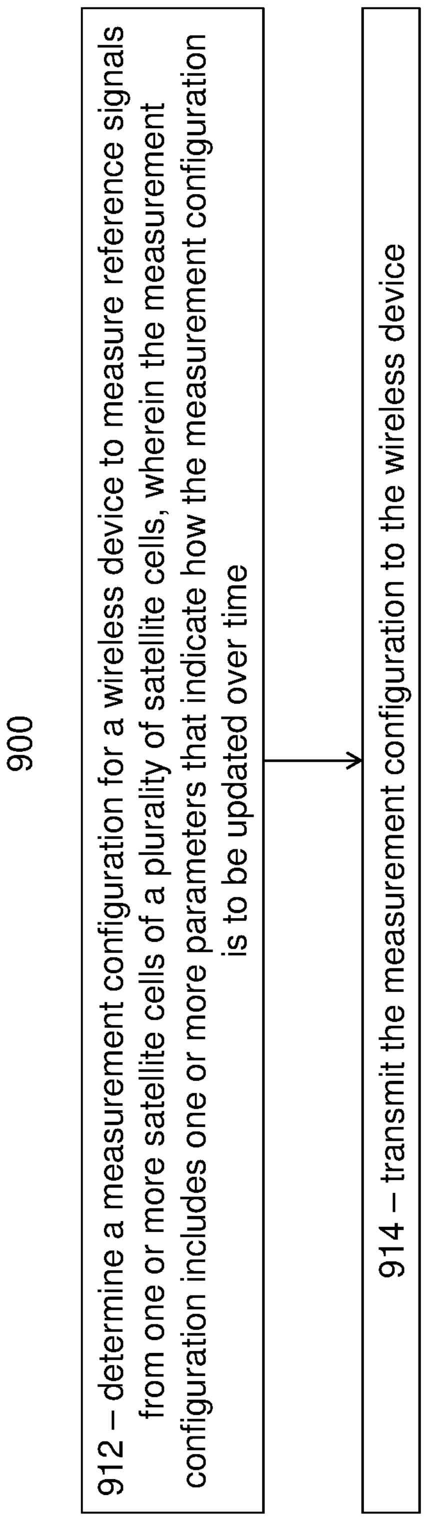
FIG. 9 is a flowchart illustrating an example method in a network node, according to certain embodiments.

FIG. 9 is a flowchart illustrating an example method in a network node, according to certain embodiments. In particular embodiments, one or more steps of FIG. 9 may be performed by network node 160 described with respect to FIG. 6.

The method begins at step 912, where the network node (e.g., network node 160) determines a measurement configuration for a wireless device to measure reference signals from one or more satellite cells of a plurality of satellite cells. The measurement configuration includes one or more parameters that indicate how the measurement configuration is to be updated over time.

In particular embodiments, the one or more parameters that indicate how the measurement configuration is to be updated over time are based on ephemeris data associated with the one or more satellite cells.

In particular embodiments, the one or more parameters that indicate how the measurement configuration is to be updated over time are based on a location of the wireless device within the one or more satellite cells.

In particular embodiments, the one or more parameters that indicate how the measurement configuration is to be updated over time comprise a measurement window or measurement gap of a configured constant duration that is periodically time shifted with a constant time shift.

In particular embodiments, the one or more parameters that indicate how the measurement configuration is to be updated over time comprise a measurement window or measurement gap of a configured constant duration that is repeatedly time shifted with a constant time shift wherein each resulting measurement window or measurement gap has an associated validity duration, after which a next time shift is applied.

In particular embodiments, the one or more parameters that indicate how the measurement configuration is to be updated over time comprise a measurement window or measurement gap of a configured constant duration that is periodically time shifted with a variable time shift.

In particular embodiments, the one or more parameters that indicate how the measurement configuration is to be updated over time comprise a measurement window or measurement gap of a configured constant duration that is periodically time shifted with a variable time shift wherein each resulting measurement window or measurement gap has an associated variable validity duration, after which a next time shift is applied.

In particular embodiments, the one or more parameters that indicate how the measurement configuration is to be updated over time comprise multiple measurement windows or measurement gaps configured in the form of complete measurement configurations together with a periodicity indicating a periodicity with which switches between the complete measurement configurations should be applied.

In particular embodiments, the one or more parameters that indicate how the measurement configuration is to be updated over time comprise multiple measurement windows or measurement gaps configured in the form of complete measurement configurations wherein each complete measurement configuration is associated with a validity duration.

In particular embodiments, the measurement configuration comprises at least one of a SMTC and a RMTC.

At step 914, the wireless device transmits the measurement configuration to the wireless device.

Modifications, additions, or omissions may be made to method 900 of FIG. 9. Additionally, one or more steps in the method of FIG. 9 may be performed in parallel or in any suitable order.

Figure 10:
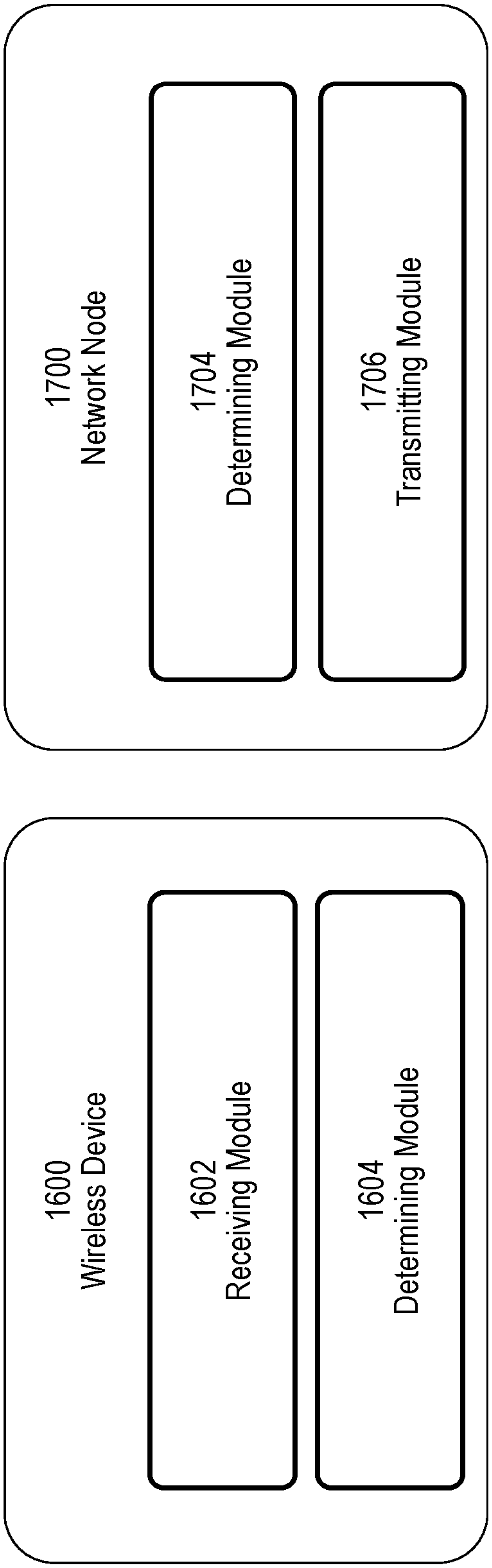
FIG. 10 illustrates a schematic block diagram of a wireless device and network node in a wireless network, according to certain embodiments.

FIG. 10 illustrates a schematic block diagram of two apparatuses in a wireless network (for example, the wireless network illustrated in FIG. 6). The apparatuses include a wireless device and a network node (e.g., wireless device 110 and network node 160 illustrated in FIG. 6). Apparatuses 1600 and 1700 are operable to carry out the example methods described with reference to FIGS. 8 and 9, respectively, and possibly any other processes or methods disclosed herein. It is also to be understood that the methods of FIGS. 8 and 9 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, and any other suitable units of apparatus 1600 to perform corresponding functions according one or more embodiments of the present disclosure. Similarly, the processing circuitry described above may be used to cause determining module 1704, transmitting module 1706, and any other suitable units of apparatus 1700 to perform corresponding functions according one or more embodiments of the present disclosure.

As illustrated in FIG. 10, apparatus 1600 includes receiving module configured to receive a measurement timing configuration according to any of the embodiments and examples described herein. Determining module 1604 is configured to dynamically adapt a measurement configuration according to any of the embodiments and examples described herein.

As illustrated in FIG. 10, apparatus 1700 includes determining module 1704 configured to determine a measurement configuration according to any of the embodiments and examples described herein. Transmitting module 1706 is configured to transmit a measurement configuration to a wireless device according to any of the embodiments and examples described herein.

Figure 11:
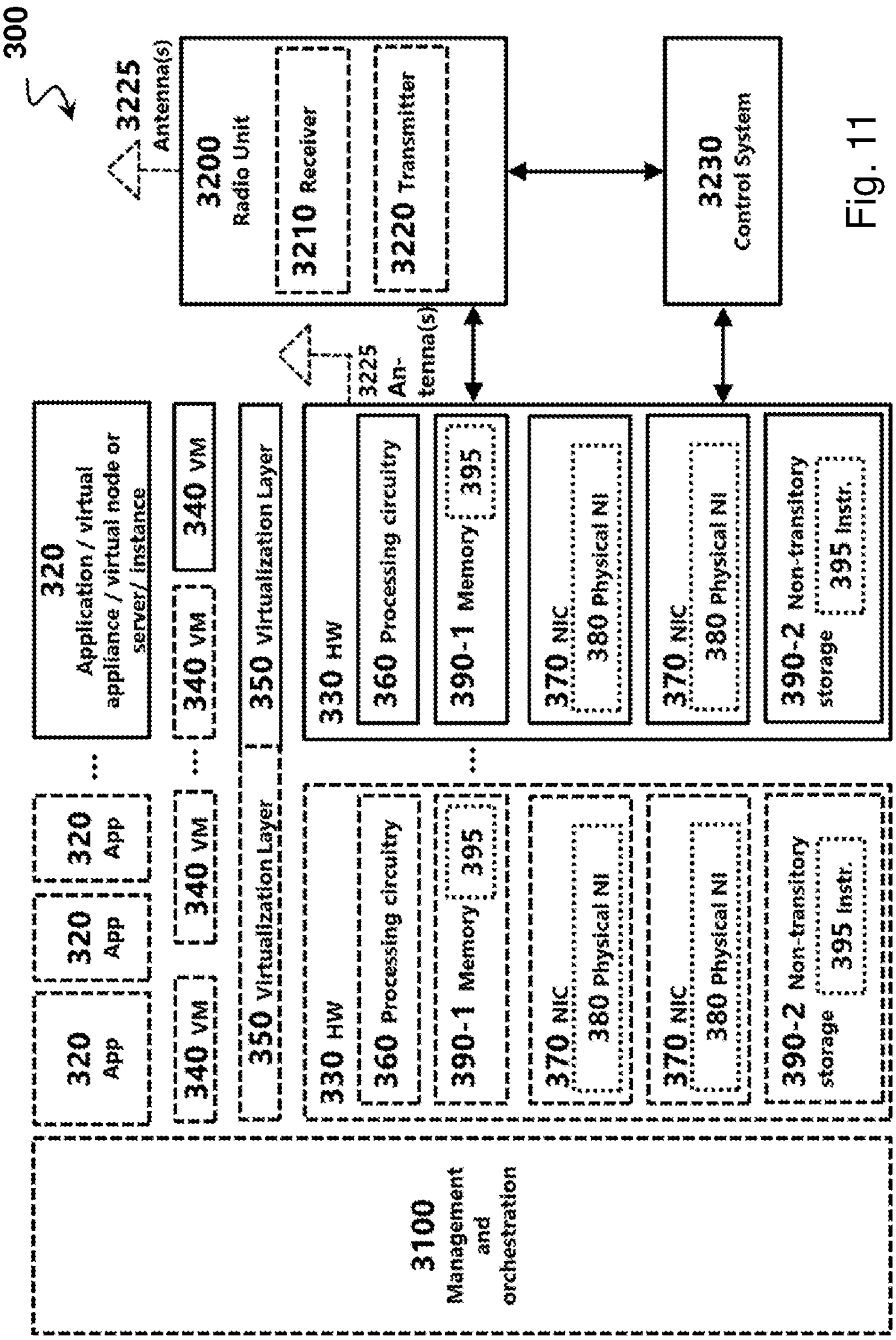
FIG. 11 illustrates an example virtualization environment, according to certain embodiments.

FIG. 11 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 11, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV. Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 12:
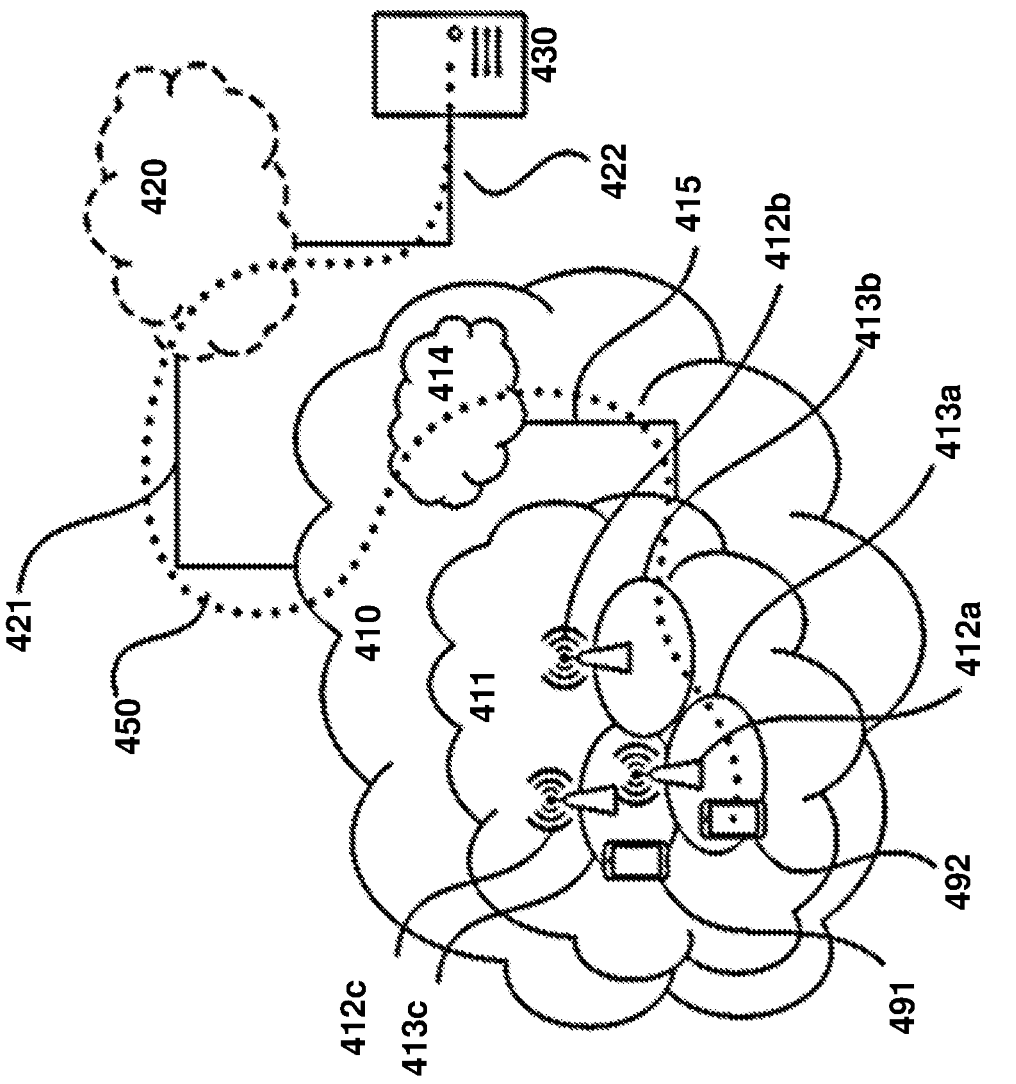
FIG. 12 illustrates an example telecommunication network connected via an intermediate network to a host computer, according to certain embodiments.

With reference to FIG. 12, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*. 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 12 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 13:
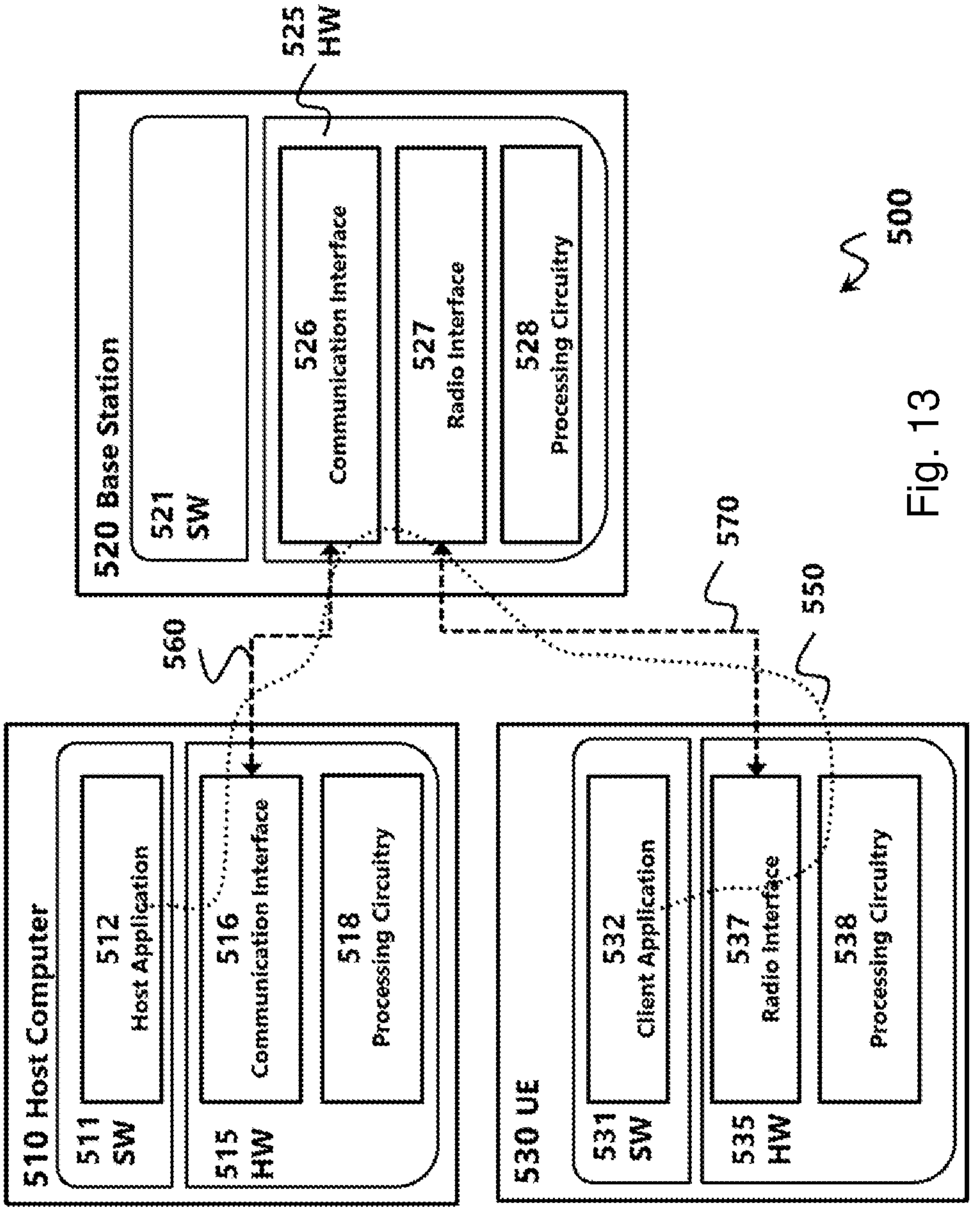
FIG. 13 illustrates an example host computer communicating via a base station with a user equipment over a partially wireless connection, according to certain embodiments.

FIG. 13 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 13. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 13) served by base station 520. Communication interface 526 may be configured to facilitate connection 560 to host computer 510. Connection 560 may be direct, or it may pass through a core network (not shown in FIG. 13) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 13 may be similar or identical to host computer 430, one of base stations 412*a*, 412*b*, 412*c* and one of UEs 491, 492 of FIG. 6, respectively. This is to say, the inner workings of these entities may be as shown in FIG. 13 and independently, the surrounding network topology may be that of FIG. 6.

In FIG. 13, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 14:
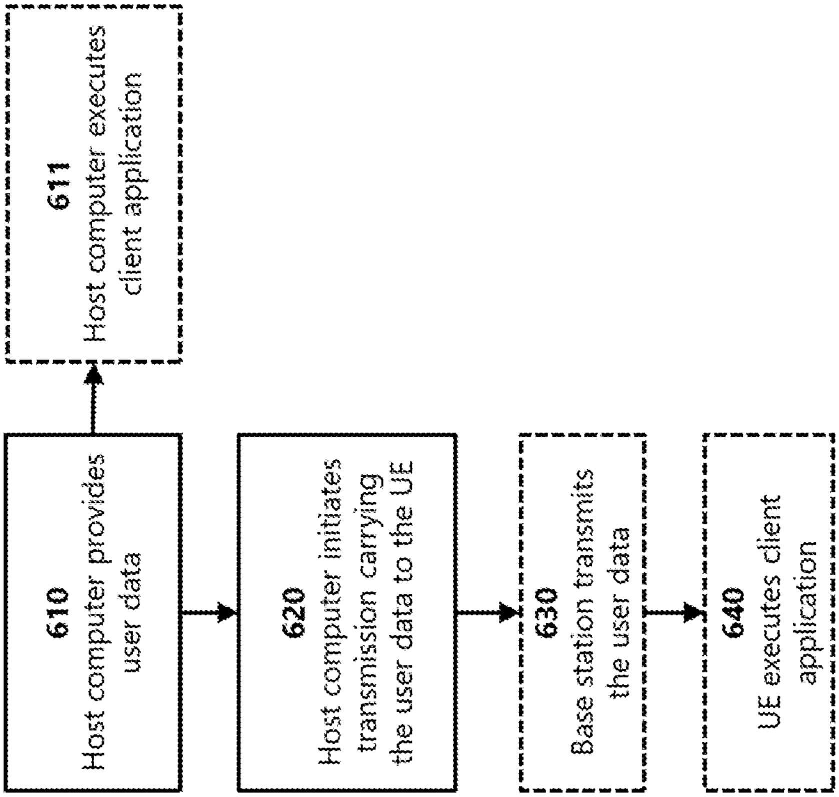
FIG. 14 is a flowchart illustrating a method implemented, according to certain embodiments.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 15:
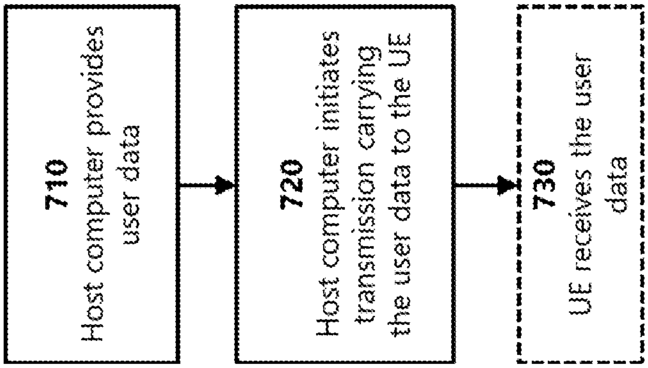
FIG. 15 is a flowchart illustrating a method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 16:
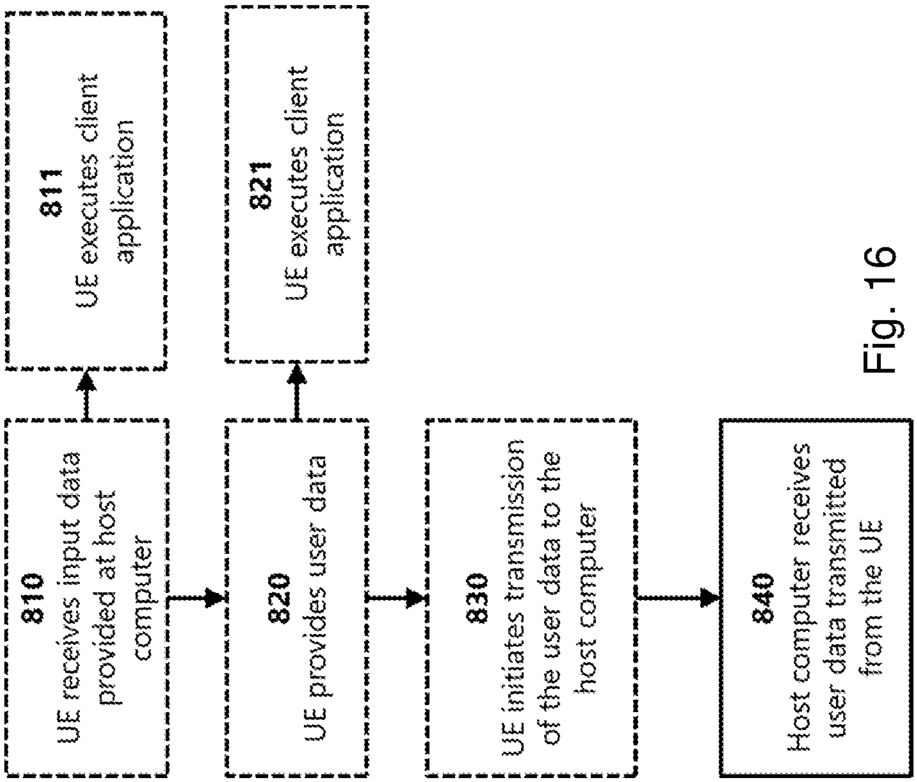
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 17:
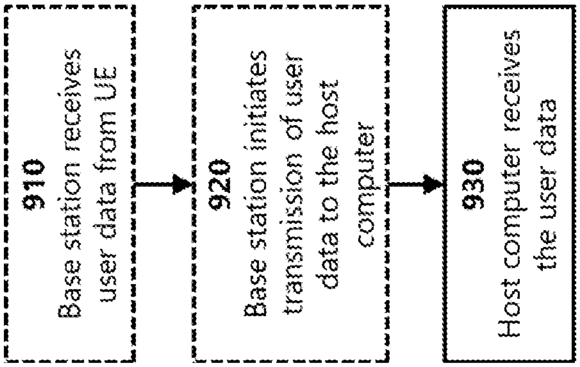
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, “each” refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

The invention claimed is:

1. A method performed by a wireless device, the method comprising:

receiving a measurement configuration to measure reference signals from one or more satellite cells of a plurality of satellite cells, wherein the measurement configuration includes one or more parameters that indicate how the measurement configuration is to be updated over time;

measuring a reference signal on one or more selected satellite cells using a first measurement configuration based on the received measurement configuration;

dynamically adapting the measurement configuration based on the received parameters that indicate how measurement configuration is to be updated resulting in a second measurement configuration;

measuring a reference signal on one or more selected satellite cells using the second measurement configuration; and wherein the one or more parameters that indicate how the measurement configuration is to be updated over time comprise a measurement window or measurement gap of a configured constant duration that is repeatedly time shifted with a constant time shift wherein each resulting measurement window or measurement gap has an associated validity duration, after which a next time shift is applied.

2. The method of claim 1, wherein the one or more parameters that indicate how the measurement configuration is to be updated over time are based on ephemeris data associated with the one or more satellite cells.

3. The method of claim 1, wherein the one or more parameters that indicate how the measurement configuration is to be updated over time are based on a location of the wireless device within the one or more satellite cells.

4. The method of claim 1, wherein the one or more parameters that indicate how the measurement configuration is to be updated over time comprise a measurement window or measurement gap of a configured constant duration that is periodically time shifted with a constant time shift.

5. A wireless device operating in a non-terrestrial network (NTN), the wireless device comprising processing circuitry operable to:

receive a measurement configuration to measure reference signals from one or more satellite cells of a plurality of satellite cells, wherein the measurement configuration includes one or more parameters that indicate how the measurement configuration is to be updated over time;

measure a reference signal on one or more selected satellite cells using a first measurement configuration based on the received measurement configuration;

dynamically adapt the measurement configuration based on the received parameters that indicate how measurement configuration is to be updated resulting in a second measurement configuration;

measure a reference signal on one or more selected satellite cells using the second measurement configuration; and wherein the one or more parameters that indicate how the measurement configuration is to be updated over time comprise a measurement window or measurement gap of a configured constant duration that is repeatedly time shifted with a constant time shift wherein each resulting measurement window or measurement gap has an associated validity duration, after which a next time shift is applied.

6. The wireless device of claim 5, wherein the one or more parameters that indicate how the measurement configuration is to be updated over time are based on ephemeris data associated with the one or more satellite cells.

7. The wireless device of claim 5, wherein the one or more parameters that indicate how the measurement configuration is to be updated over time are based on a location of the wireless device within the one or more satellite cells.

8. The wireless device of claim 5, wherein the one or more parameters that indicate how the measurement configuration is to be updated over time comprise a measurement window or measurement gap of a configured constant duration that is periodically time shifted with a constant time shift.

9. The wireless device of claim 5, wherein the one or more parameters that indicate how the measurement configuration is to be updated over time comprise a measurement window or measurement gap of a configured constant duration that is periodically time shifted with a variable time shift.

10. The wireless device of claim 9, wherein the one or more parameters that indicate how the measurement configuration is to be updated over time comprise a measurement window or measurement gap of a configured constant duration that is periodically time shifted with a variable time shift wherein each resulting measurement window or measurement gap has an associated variable validity duration, after which a next time shift is applied.

11. The wireless device of claim 5, wherein the one or more parameters that indicate how the measurement configuration is to be updated over time comprise multiple measurement windows or measurement gaps configured in the form of complete measurement configurations together with a periodicity indicating a periodicity with which switches between the complete measurement configurations should be applied.

12. The wireless device of claim 5, wherein the one or more parameters that indicate how the measurement configuration is to be updated over time comprise multiple measurement windows or measurement gaps configured in the form of complete measurement configurations wherein each complete measurement configuration is associated with a validity duration.

13. The wireless device of claim 5, wherein the measurement configuration comprises at least one of a synchronization signal block (SSB) measurement timing configuration (SMTC) and a received signal strength indicator (RSSI) measurement timing configuration (RMTC).

* * * * *